(12) United States Patent
Dhesikan et al.

(10) Patent No.: US 7,499,415 B2
(45) Date of Patent: Mar. 3, 2009

(54) SYSTEM AND METHOD FOR PRESERVING BANDWIDTH IN A RSVP ENVIRONMENT

(75) Inventors: Subhasri Dhesikan, San Jose, CA (US); Keith A. Lantz, Los Altos, CA (US); Kevin E. Miller, Cary, NC (US); Rongxuan V. Chen, San Jose, CA (US); John K. Restrick, Jr., Palo Alto, CA (US); Scott A. Henning, Plano, TX (US); Martin W. Wu, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 11/217,139

(22) Filed: Aug. 31, 2005

(65) Prior Publication Data
US 2006/0268824 A1    Nov. 30, 2006

Related U.S. Application Data

(63) Continuation of application No. 11/135,697, filed on May 24, 2005.

(51) Int. Cl.
*H04L 12/18* (2006.01)
(52) U.S. Cl. .................. 370/260; 370/395.2
(58) Field of Classification Search ............. 370/236, 370/236.1, 260, 261, 270, 395.2
See application file for complete search history.

(56) References Cited

U.S. PATENT DOCUMENTS

| | | | |
|---|---|---|---|
| 681,983 A | 9/1901 | Schoellhorn et al. | |
| 6,031,841 A | 2/2000 | Woundy | 370/410 |
| 6,101,549 A | 8/2000 | Baugher et al. | 709/238 |
| 6,366,577 B1 | 4/2002 | Donovan | 370/352 |
| 6,385,207 B1 | 5/2002 | Woundy | 370/410 |
| 6,519,254 B1 | 2/2003 | Chuah et al. | 370/389 |
| 6,721,272 B1 | 4/2004 | Parnafes et al. | 370/235 |
| 6,763,392 B1 | 7/2004 | del Val et al. | 709/231 |
| 6,765,927 B1 | 7/2004 | Martin et al. | 370/469 |
| 6,854,013 B2 | 2/2005 | Cable et al. | 709/226 |
| 7,145,898 B1 * | 12/2006 | Elliott | 370/352 |

(Continued)

OTHER PUBLICATIONS

J. P. Vasseur, "A Per-domain path computation method for computing Inter-domain Traffic Engineering (TE) Label Switched Path (LSP)", IETF Internet Draft.

(Continued)

*Primary Examiner*—Wing F Chan
*Assistant Examiner*—Matthew Campbell
(74) *Attorney, Agent, or Firm*—Baker Botts L.L.P.

(57) ABSTRACT

A communication system includes a call agent that coordinates and supervises communications between endpoints. The call agent allocates a QoS agent for each endpoint involved in a call. The QoS agents generate reservations for the call in order to provide the call with a guaranteed amount of bandwidth and an established QoS. Each endpoint or location associated with an endpoint has a reservation policy that determines how calls are to be handled when a reservation is or is not obtained and when a reservation is lost or obtained during a call. The communication system is able to handle reservations, or the lack thereof, during various situations like on hold, call transfer, call forwarding, conference call, and shared line services.

28 Claims, 18 Drawing Sheets

U.S. PATENT DOCUMENTS 7,281,043 B1 * 10/2007 Davie .......................... 709/226
2008/0049734 A1 * 2/2008 Zhakov et al. .............. 370/352

OTHER PUBLICATIONS

IETF Standard-Working-Draft, Internet Engineering Task Force, IETF, CH, Feb. 2005, pp. 1-20, XP015039803.

G. Camarillo, Ed. Ericsson, W. Marshall, Ed. AT&T, J. Rosenberg, "Integration of Resource Management and Session Initiation Protocol (SIP)," Network Working Group, RFC 3312, http://www.faqs.org/rfcs/rfc3312.html, 21 pgs, Oct. 2002.

W. Marshall, Ed. AT&T, "Private Session Initiation Protocol (SIP) Extensions for Media Authorization," Network Working Group, RFC 3313, http://www.faqs.org/rfcs/rfc3313.html, 12 pgs, Jan. 2003.

Meyer, et al., "MPLS Traffic Engineering Soft Preemption", http:www.ietf.org/proceedings/03juI/I-D/draft-ietf-mpls-soft-preemption-00.txt, 9 pgs., Feb. 2003.

* cited by examiner

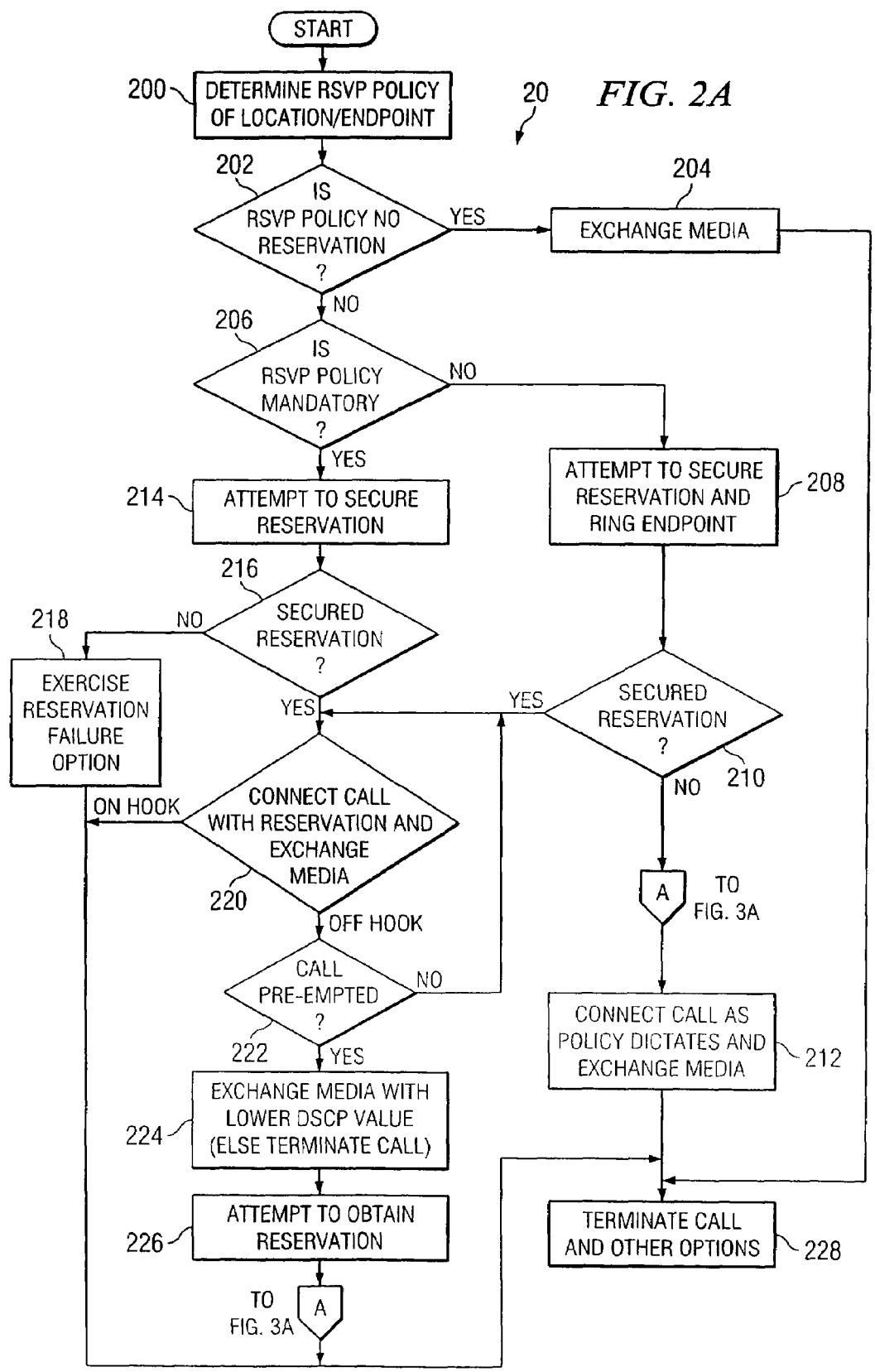

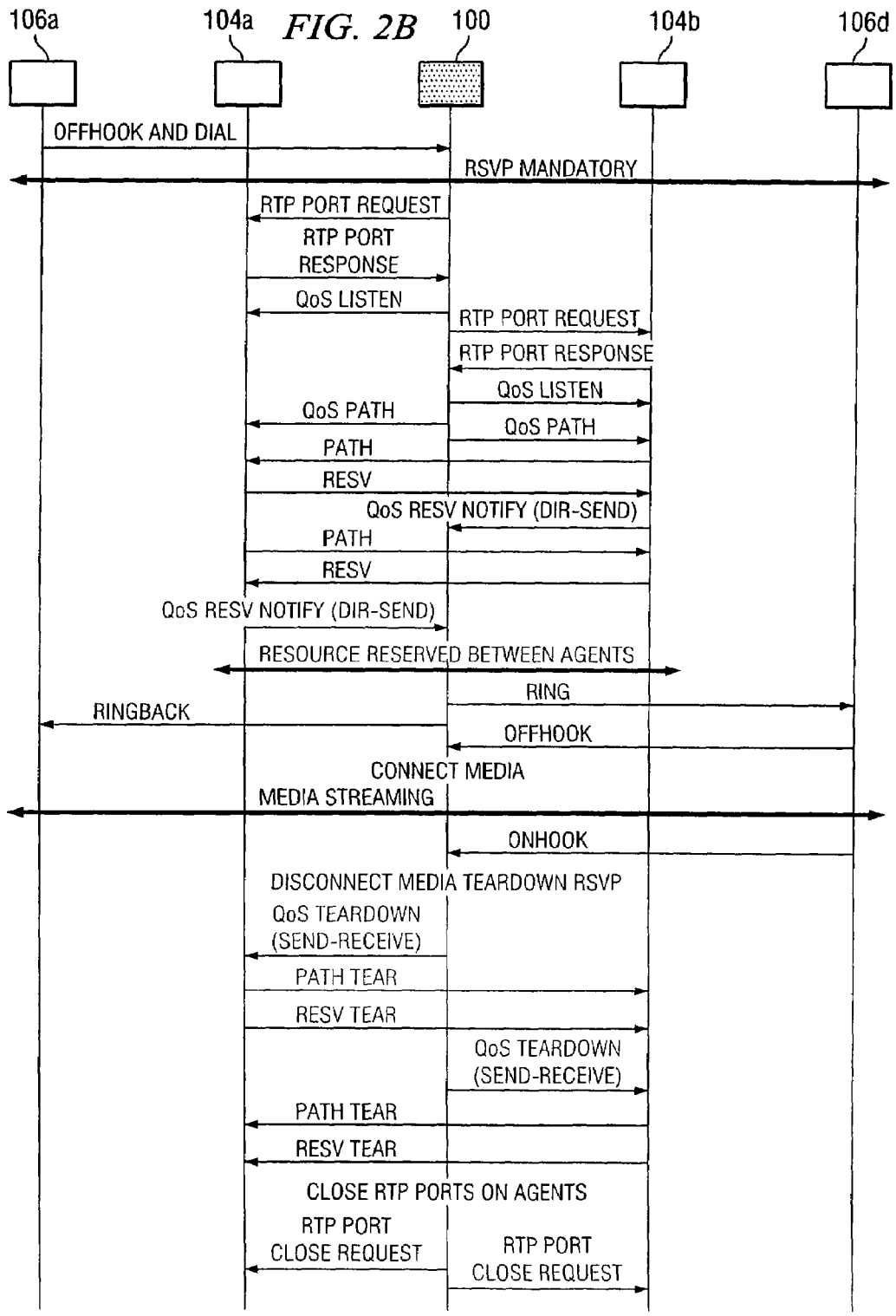

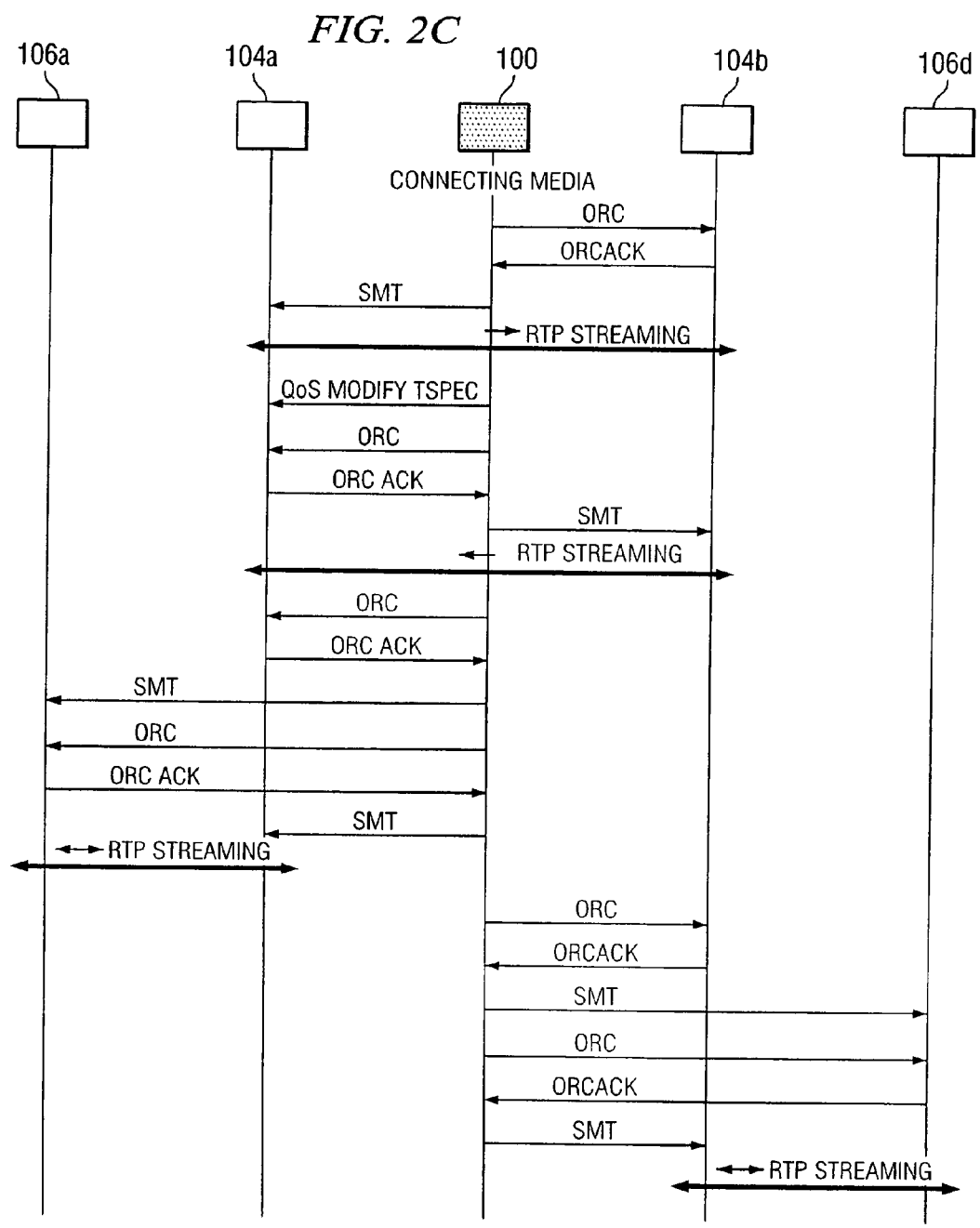

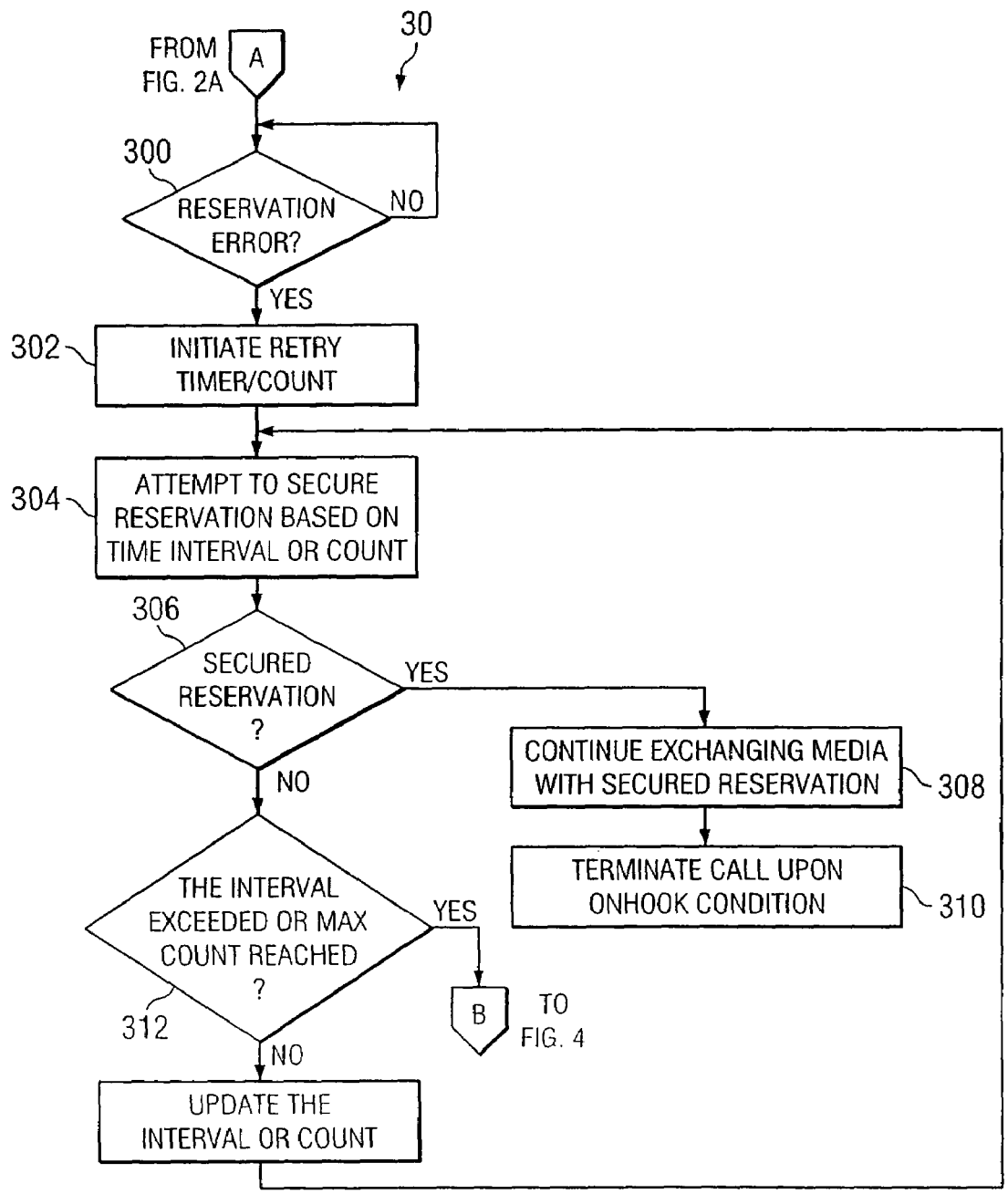

TO FIG. 3Bb

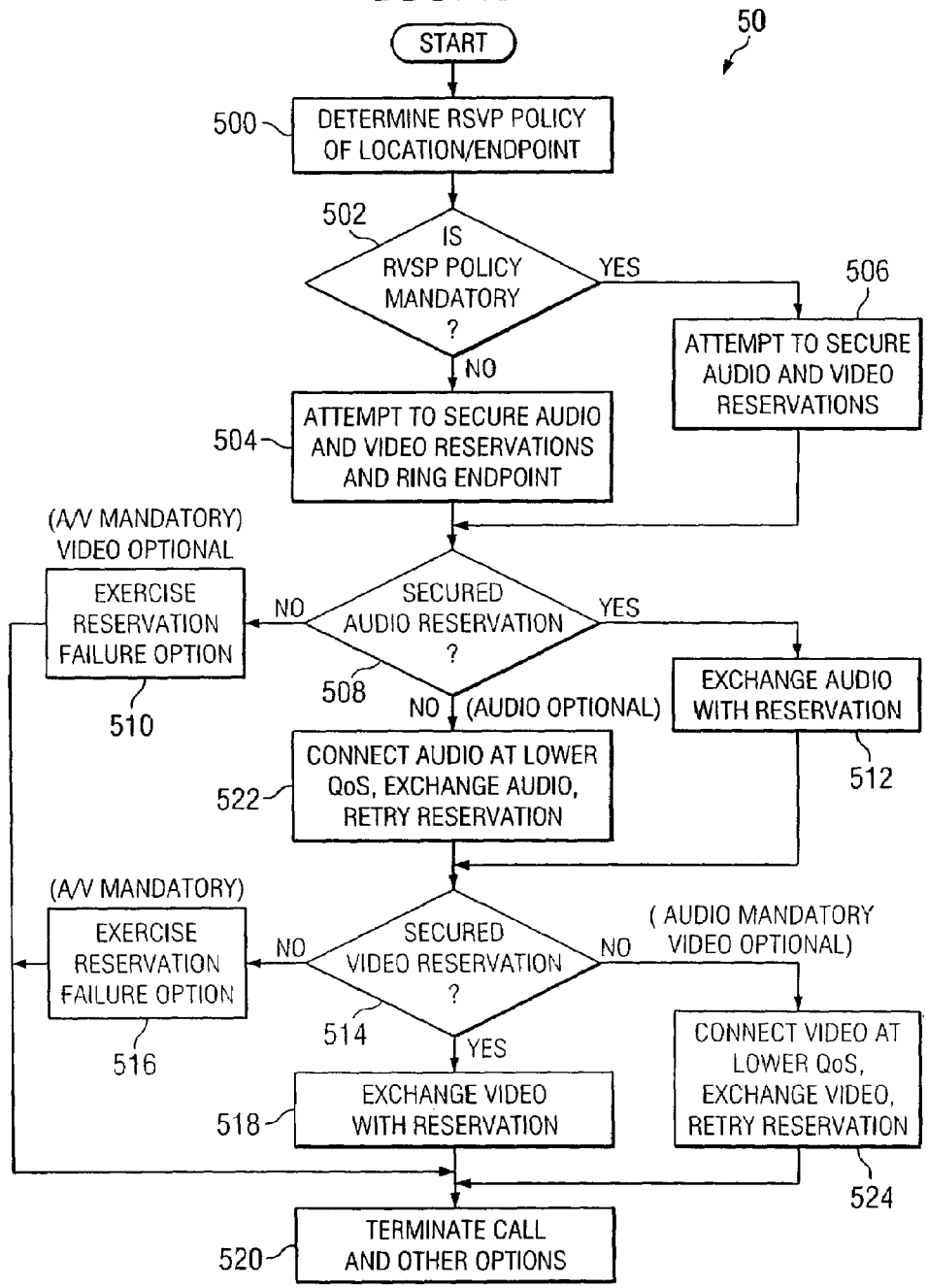

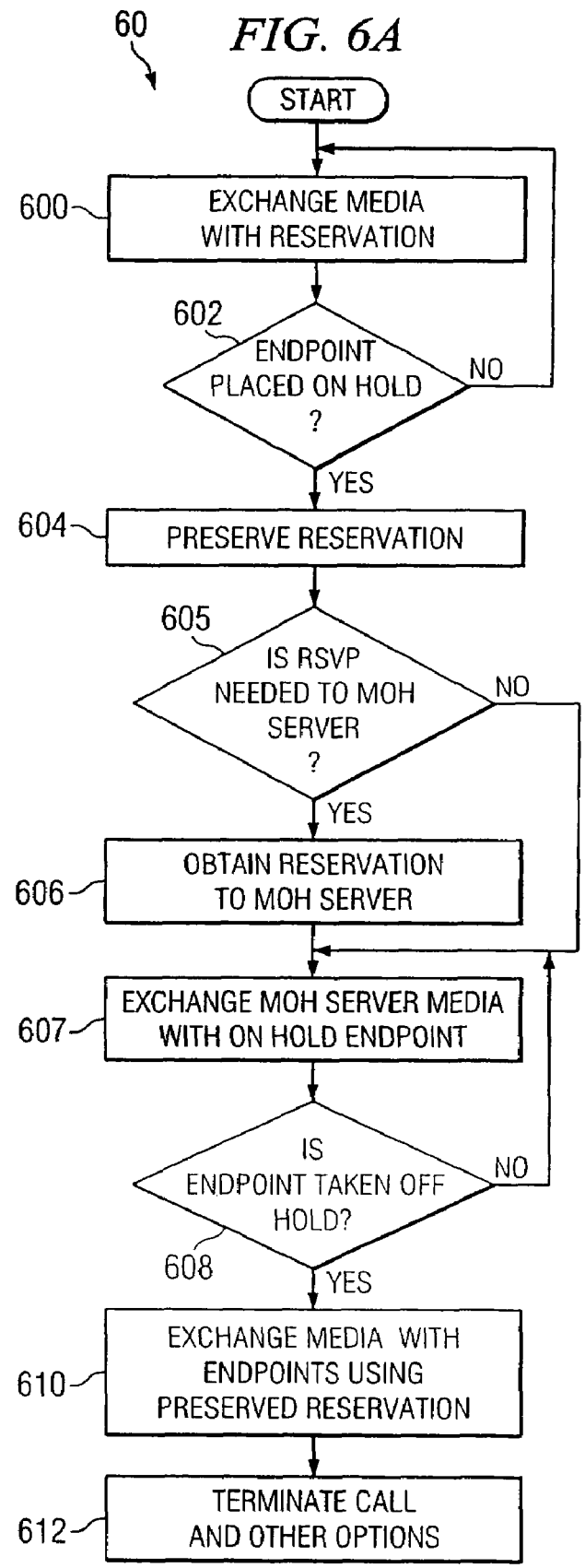

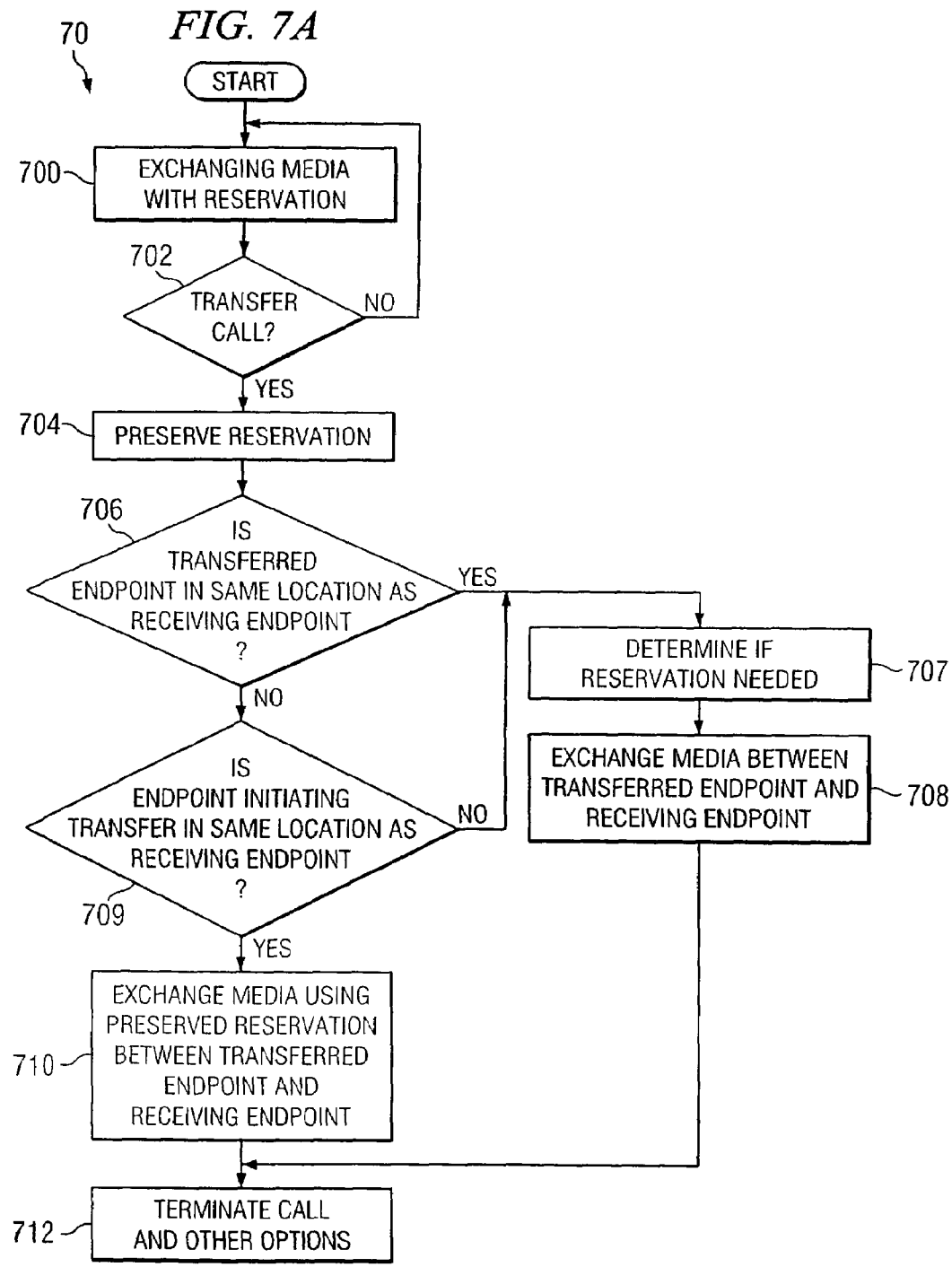

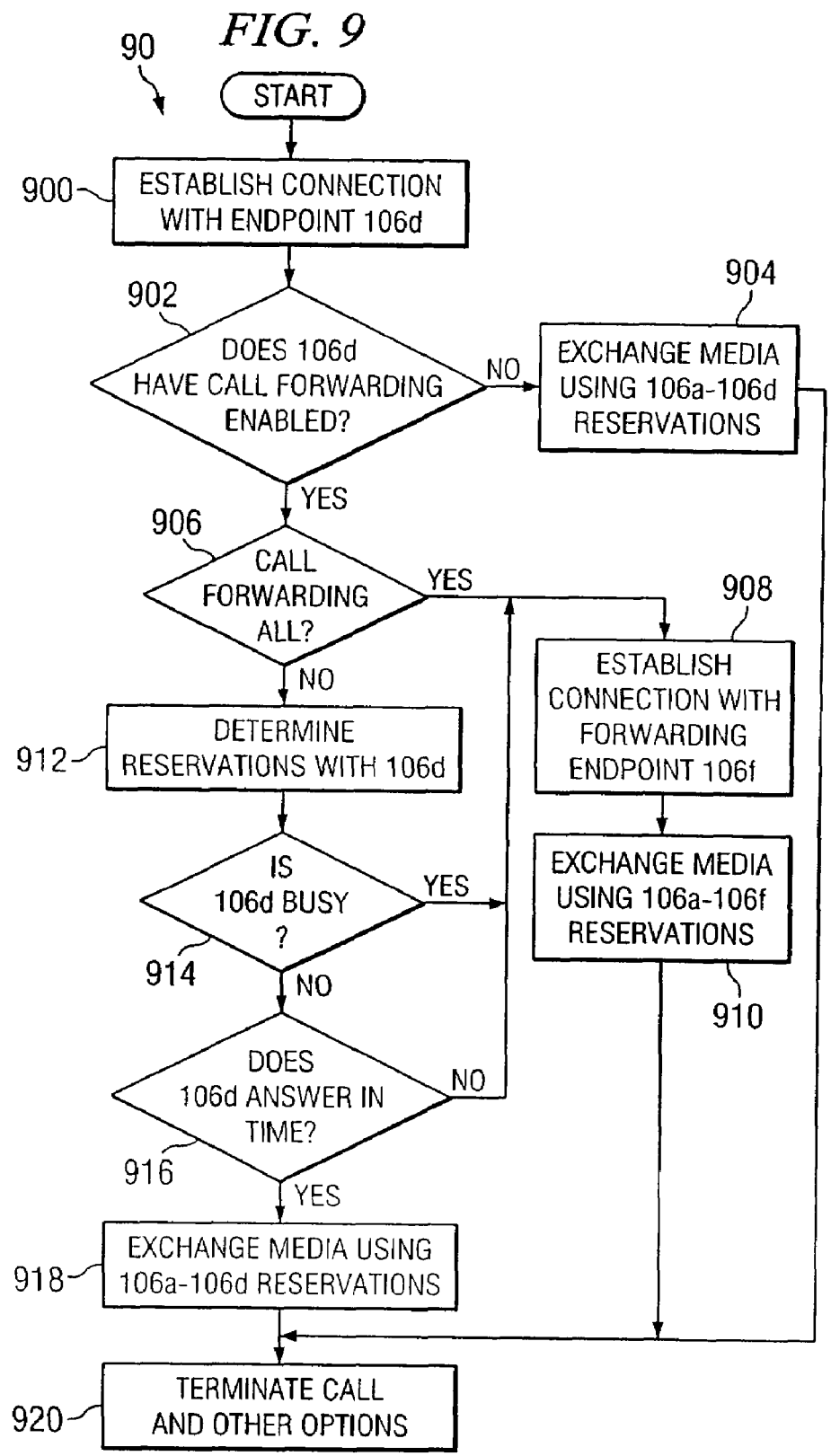

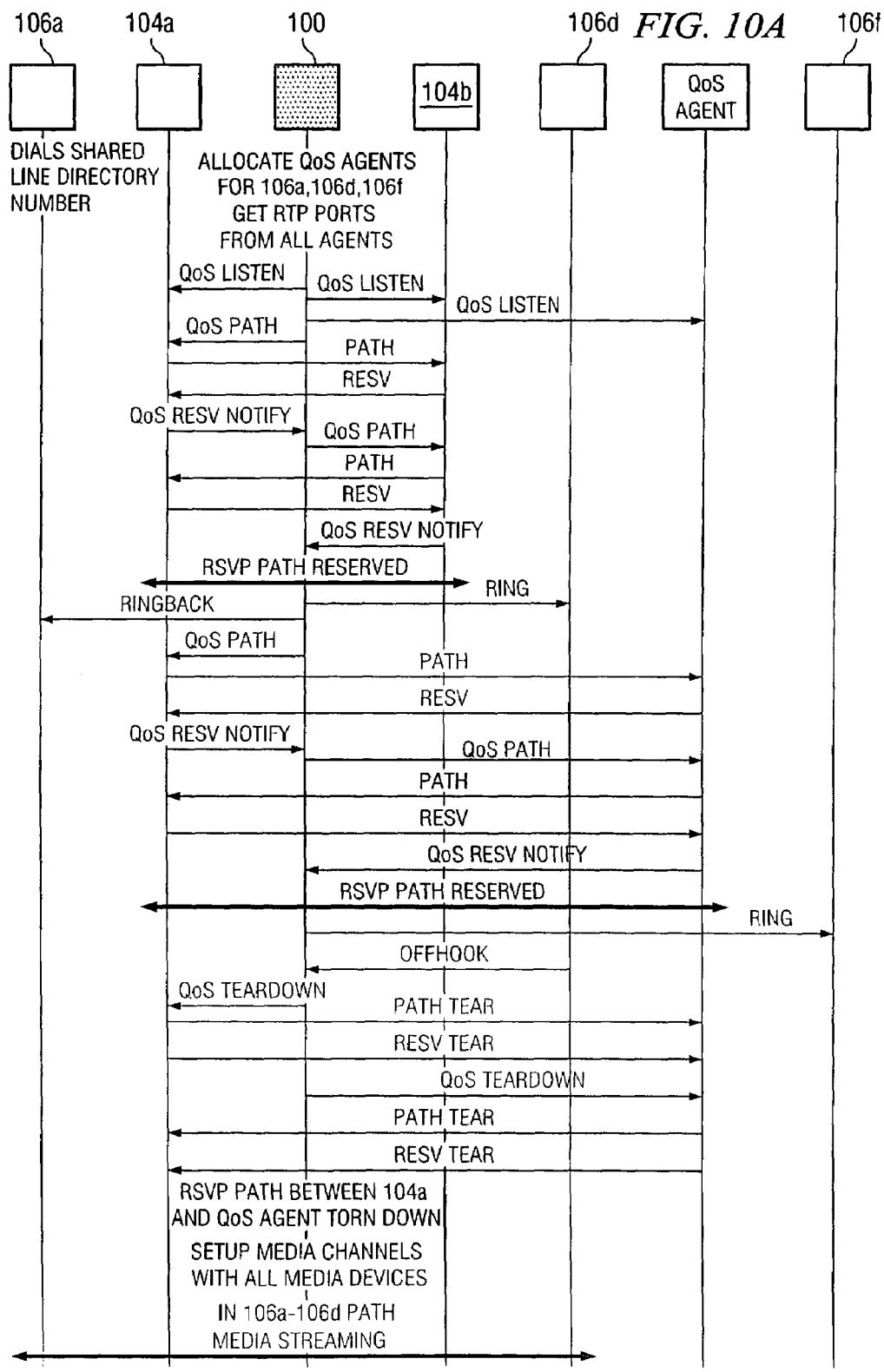

SYSTEM AND METHOD FOR PRESERVING BANDWIDTH IN A RSVP ENVIRONMENT

RELATED APPLICATIONS

This application is a continuation application of U.S. application Ser. No. 11/135,697 filed May 24, 2005.

TECHNICAL FIELD OF THE INVENTION

This invention relates generally to the field of communications and more specifically to a system and a method for preserving bandwidth in a RSVP environment.

BACKGROUND OF THE INVENTION

The field of communications has become increasingly important in today's society. In particular, the ability to quickly and effectively interact with an individual through any suitable communications media presents a significant obstacle for component manufacturers, system designers, and network operators. This obstacle is made even more difficult due to the plethora of diverse communication technologies that exist in the current marketplace. Because of the many communication technologies, many components cannot interact with each other. As new communication platforms become available to the consumer, new protocols need to be developed to optimize these emerging technologies.

SUMMARY OF THE INVENTION

In accordance with the present invention, disadvantages and problems associated with previous techniques for preserving bandwidth in a Resource Reservation Protocol (RSVP) environment in a communication system may be reduced or eliminated.

According to one embodiment of the present invention a communication system is provided that includes a call agent controlling the setup of a call between two or more endpoints. The call agent interacts with a quality of service (QoS) agent that establishes reservations between endpoints in order to guarantee a certain amount of bandwidth for the call. The QoS agents provide information concerning obtained and failed reservations between endpoints to the call agent so that the call agent can establish an appropriate connection for the call between the endpoints. The call agent implements different pre-call and mid-call reservation policies and initiates procedures to obtain a reservation for the call upon a failure.

Certain embodiments of the invention may provide one or more technical advantages. A technical advantage of one embodiment may be that RSVP can be used in a system without having to touch every endpoint. The endpoints may support different protocols and interact with RSVP within the same system. Furthermore, endpoints that are RSVP-enabled can communicate with non-RSVP enabled endpoints. Another technical advantage of another embodiment may be that calls do not fail if a RSVP reservation is not secured with the initial attempt. Allowing calls to proceed without a RSVP reservation prevents complete call failure. Yet another technical advantage of an embodiment may be that calls may gain a reservation during a call, which improves the QoS, or may restore a reservation that fails mid-call, which also improves a call's QoS.

Certain embodiments of the invention may include none, some, or all of the above technical advantages. One or more other technical advantages may be readily apparent to one skilled in the art from the figures, descriptions, and claims included herein.

BRIEF DESCRIPTION OF THE FIGURES

For a more complete understanding of the present invention and its features and advantages, reference is now made to the following description, taken in conjunction with the accompanying figures, wherein like reference numerals represent like parts, in which:

FIGS. 2A-2C represent a flowchart and message flows illustrating an embodiment of a method for securing a reservation in the communication system;

FIGS. 3A, 3Ba, and 3Bb represent a flowchart and a message flow illustrating an embodiment of a method for retrying a reservation in the communication system;

FIGS. 5A-5B represent a flowchart and a message flow illustrating another embodiment of a method for securing both an audio and a video stream in the communication system;

FIGS. 6A-6B represent a flowchart and a message flow illustrating an embodiment of a method for preserving bandwidth in an on hold situation;

FIGS. 7A-7B represent a flowchart and a message flow illustrating another embodiment of a method for preserving bandwidth in a call transfer situation;

FIG. 9 is a flowchart illustrating another embodiment of a method for preserving bandwidth in a call forwarding situation;

FIGS. 10A-10B represent message flows illustrating a shared line situation;

DETAILED DESCRIPTION OF THE INVENTION

Figure 1:
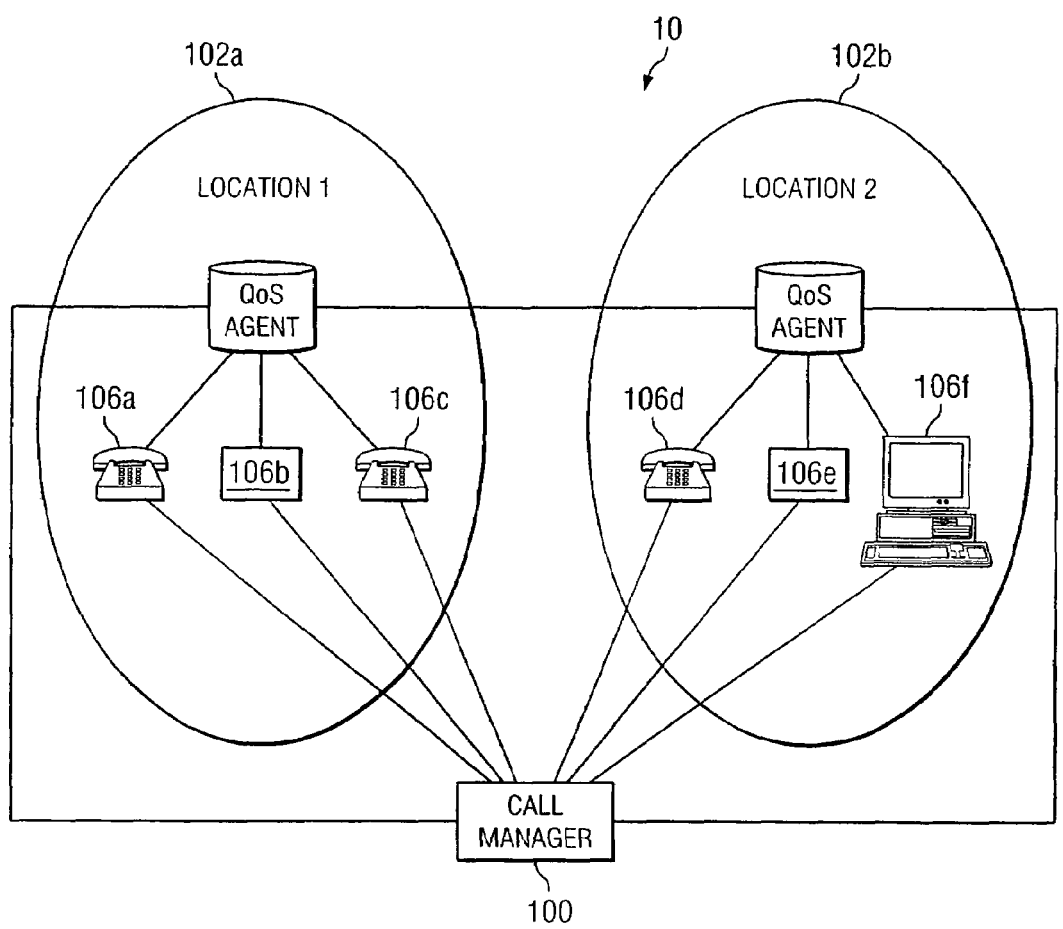
FIG. 1 is a simplified block diagram illustrating a communication system that may implement a reservation feature.

FIG. 1 is a simplified block diagram of a communication system 10 for implementing a reservation feature within the Resource Reservation Protocol (RSVP), which can optimize communications, in any suitable environment. Communication system 10 includes a call agent 100 that manages calls in one or more locations 102. The call agent 100 allows the locations 102 to communicate internally and with other locations 102 using the reservation feature at suitable times. Within a location 102, such as location 102a or 102b, there may be a plurality of endpoints 106 that receive and originate media flows. As shown, location 102a has endpoints 106a, 106b, and 106c. Location 102b has endpoints 106d, 106e, and 106f. Each location 102a and 102b includes a QoS (QoS) agent 104a and 104b that controls the implementation of RSVP.

Call agent 100 is a centralized entity that controls the exchange of media between locations 102a and 102b and between individual endpoints 106 within locations 102a and 102b. Call agent 100 may also be responsible for RSVP signaling. As a result, call agent 100 is located within the signaling path. Call agent 100 may be configured to reflect the Reservation handling policies. Call agent 100 may include a user interface that receives configuration information. For example, a user may configure the Reservation handling policy of locations 102a and 102b at call agent 100.

Locations 102*a* and 102*b* are logical groupings of endpoints within communication system 10 and are not necessarily based on geographic location. Each location 102 represents a series of points or nodes of interconnected communications paths for receiving and transmitting packets of information that propagate through communication system 10. Locations 102 may communicate with each other or with other devices and locations where appropriate. Each location 102 may offer some service or capability to an endpoint or set of endpoints. Locations 102 may also be connected to one or more additional network elements. For example, locations 102 may be connected to a service provider network. Location 102 may also include the functionality of call agent 100. Locations 102 may be any suitable architecture, such as a local area network (LAN), an enterprise network, a virtual private network (VPN), a metropolitan area network (MAN), or a wide area network (WAN) or any other appropriate architecture or system that facilitates communications.

Endpoints 106 establish a communication tunnel, link, or session in communication system 10 via locations 102. Endpoints 106 may be configured to implement a specific Reservation handling policy when attempting to secure a reservation. Endpoints 106 may include Skinny Client Control Protocol (SCCP) telephones, Session Initiation Protocol (SIP) telephones, a computer, a personal digital assistant, a laptop, videoconferencing devices, gateways, or any other suitable endpoint. Endpoints 106 may be enabled by any protocol such as SCCP, SIP, H.323, Media Gateway Control Protocol (MGCP), or any other suitable protocol. In the illustrated embodiment, location endpoint 106*a* may be an Internet protocol telephone, endpoint 106*b* may be a computer and endpoint 106*c* may be a gateway. For location 102*b*, endpoint 106*d* may be a SIP telephone, endpoint 106*e* may be a gateway, and endpoint 106*f* may be a videoconferencing device.

QoS agents 104*a* and 104*b*, respectively, are coupled to an associated call agent 100 and to associated endpoints 106. QoS agents 104 represent endpoints 106, reserve bandwidth on behalf of endpoints 106, and are involved in the signaling and media exchange between endpoints 106 as determined by call agent 100. QoS agents 104 control the implementation of RSVP by determining the available bandwidth and making reservations on behalf of endpoints 106. A call leg and a signaling path may be created by any one of QoS agents 104. QoS agents 104 may be switches, gateways, bridges, voicemail servers, routers, and load balancers. Using QoS agents 104, RSVP support is extended to calls established by any appropriate protocol such as a real-time protocol (RTP), a user datagram protocol (UDP), SCCP, SIP, H.323, or any other appropriate type of protocol or technology. QoS agents 104 may also accommodate audio and video media streams, audio and video conferences, and perform appropriate transcoding operations.

QoS agents 104 may provide Differentiated Services Code Point (DSCP) marking of each packet in the media stream. DSCP marking specifies the class of service for each packet. The DSCP marking is updated based on the outcome of the reservation function. Call Agent 100 will allow for special DSCP markings that indicate a different level of service for calls that fail to obtain a reservation or lose a reservation during the call. Thus, by utilizing different DSCP values, Call Agent 100 can prevent calls from failing even if the call is preempted by the network.

QoS agents 104 may also support Multi-Level Precedence and Preemption (MLPP), in which calls with a higher priority designation may preempt calls with a lower priority designation. Call Agent 100 passes caller precedence levels to QoS agents 104 in a QoS message. This allows a router to preempt a flow based on the precedence level. QoS agents 104 notify call agent 100 about reservation failures as a result of preemption. Call agent 100 handles the preemptions as per configured policies and notifies the endpoints 106 if the call is to be preempted.

RSVP is a transport level signaling protocol for reserving resources in an unreliable Internet Protocol (IP) based network using a reservation. RSVP provides an alternate call admission control mechanism within call agent 100. Customers in today's telecommunications environment are attempting to move away from a hub and spoke network topology for video conferencing and video telephony applications. The use of RSVP will assist in realizing this goal. Important features of RSVP include making a reservation of bandwidth for a particular session, which is a flow that has a particular destination address, destination port, and protocol identifier. RSVP messages travel along the same path as the media flow in a unidirectional manner. Thus, flows are reserved in one direction only and each session is treated as an independent unit. RSVP messages flow transparently through non-RSVP routers and switches. RSVP supports unicast and multicast environments and is receiver oriented in that the receiver of the stream requests the reservation. By having a reservation, a call can utilize reserved bandwidth and experience improved QoS.

For a brief overview of call operation, caller endpoint 106*a* attempts to contact callee endpoint 106*d*. If call agent policies provide for RSVP in establishing a given call, call agent 100 allocates resources of QoS agents 104 for calling and called parties. Call agent 100 instructs QoS agents 104*a* and 104*b* to attempt RSVP reservation on behalf of endpoints 106*a* and 106*d*. QoS agent 104*a* initiates a PATH message that contains a description or advertisement of the desired traffic flow. The PATH message travels from QoS agent 104*a* to QoS agent 104*b* along the same path as that of the media flow. Any RSVP-capable network devices along the path will collect appropriate information from the PATH message and store it as path state. When QoS agent 104*b* receives a PATH message, it can request resources for the media flow described in the PATH message by transmitting a RESV message. The RESV message is transmitted along the reverse path as that of the PATH message and the media flow. Each RSVP-capable device along the reverse path receives the RESV message and decides whether to accept or deny the request. If the request is accepted, then the necessary state is stored and the RESV message is forwarded down the reverse path. If the request is denied, a RESVERR message is generated and sent along the original path and the RESV message is not forwarded any further. The establishment of a one-way RSVP reservation successfully completes when the QoS agent 104*a* receives a RESV message in response to its PATH message. Upon securing a reservation, call agent 100 rings callee endpoint 106*d*. Caller endpoint 106*a* and callee endpoint 106*d* can then exchange media.

Whether a reservation is required for a given call depends on a Reservation handling policy configured for a location or endpoint. Calls within the same location may not require a reservation by default. Any type of Call Admission Control (CAC) may be used when RSVP is not implemented for a particular call. The Reservation handling policy for the location or endpoint may be configured by the user. A location's or endpoint's Reservation handling policy may be one of the following: no reservation (none), audio and video reservation mandatory (audio/video mandatory), audio reservation mandatory and video optional (video optional), or audio reservation optional and video optional (audio optional). Though for discussion purposes only four Reservation handling policies are mentioned, other Reservation handling policies may be implemented as well, such as for example a video mandatory and audio optional Reservation handling policy. A no reservation policy means that a reservation is not necessary to video stream in an audio optional policy will only be available if the RSVP reservation succeeds for the video stream. Table I provides a summary of the different Reservation handling policy procedures to be discussed in greater detail below.

TABLE I

| INITIAL RESERVATION POLICY | MID-CALL RESERVATION POLICY | ACTION | RESULT |
|---|---|---|---|
| Mandatory Audio Mandatory Video | N/A | Initial audio failure | Call fails to initiate |
| Mandatory Audio Mandatory Video | N/A | Initial video failure | Call fails to initiate |
| Mandatory Audio Mandatory Video | Fail after x retries | Mid-call audio failure | Call fails if unable to secure reservation after x retries |
| Mandatory Audio Mandatory Video | Fail after x retries | Mid-call video failure | Call fails if unable to secure reservation after x retries |
| Mandatory Audio Mandatory Video | Best effort and continue retries | Mid-call audio failure | Audio proceeds as best effort until reservation is successful |
| Mandatory Audio Mandatory Video | Best effort and continue retries | Mid-call video failure | Call proceeds as audio call until video reservation is secured. |
| Mandatory Audio & video if reservation successful | N/A | Initial audio failure | Call fails |
| Mandatory Audio & video if reservation successful | N/A | Initial video failure | Call proceeds as audio call |
| Mandatory Audio & video if reservation successful | Fail after x retries | Mid-call audio failure | Calls fails if unable to secure reservation after x retries |
| Mandatory Audio & video if reservation successful | Fail after x retries | Mid-call video failure | Call proceeds as audio call until video reservation is secured. |
| Mandatory Audio & video if reservation successful | Best effort and continue retries | Mid-call audio failure | Audio proceeds as best effort until reservation is successful |
| Mandatory Audio & video if reservation successful | Best effort and continue retries | Mid-call video failure | Call proceeds as audio call until video reservation is secured. |
| Optional Audio & video if reservation successful | N/A | Initial audio failure | Audio proceeds as best effort until reservation is successful |
| Optional Audio & video if reservation successful | N/A | Initial video failure | Call proceeds as audio call |
| Optional Audio & video if reservation successful | Best effort and continue retries | Mid-call audio failure | Audio proceeds as best effort until reservation is successful |
| Optional Audio & video if reservation successful | Best effort and continue retries | Mid-call video failure | Call proceeds as audio call until video reservation is secured. | connect a call. The call may be connected through another call admission control mechanism. In an embodiment, this may be the default for endpoints within the same location. For an audio/video mandatory policy, a call cannot be connected until every media stream being transmitted receives a RSVP reservation. If a reservation is not successful for any one of the media streams, the call will be released. For example, if an audio stream receives a reservation but a video stream does not receive a reservation, the call will be released. Under a video optional policy, the audio stream of a call will not be connected until a RSVP reservation succeeds. The call may connect with only audio and video can be added to the call if a reservation for the video stream succeeds. An audio optional policy does not require a reservation to be established for an audio stream before the call proceeds. An attempt may be made to secure a RSVP reservation, but the call will proceed regardless of the reservation's success. The call may not have a high QoS, but will proceed with a "best efforts" quality. A The QoS for a call may be managed through a mixture of RSVP and any other types of Call Admission Control mechanisms. It may not be possible for the RSVP functionality to be operational over the entire communication system 10. Thus, some devices in some locations of communication system 10 will have a QoS agent configuration while other devices may not. As an example, when a call is initiated from a location that has RSVP capability to another location that is not RSVP enabled, call agent 100 will manage the QoS for the call using both mechanisms. The first part of the call, from the RSVP enabled location to a hub or central site that is RSVP enabled, will be processed through the RSVP mechanism. The second part of the call, from the hub or central site to the non-RSVP capable location, will be managed through another Call Admission Control type. If either mechanism fails to allocate appropriate bandwidth, the call fails. Since other Call Admission Control types may not have any optional policy, the call will be rejected if there is not enough location bandwidth.

There will not be a best efforts call as is available under the RSVP mechanism. Accordingly, if the QoS for a call is managed by both a separate Call Admission Control mechanism and a RSVP mechanism, the Reservation handling policy only affects the portion of the call that is managed by the RSVP mechanism. For the port of the call managed by another Call Admission Control, only mandatory policy behavior is supported and the call either succeeds or fails with no possibility for degraded best efforts service for the call.

Modifications, additions, or omissions may be made to the system without departing from the scope of the invention. For example, locations 102 can be changed, modified, rearranged, or reconfigured to achieve their intended operations as they pertain to the reservation function. In an embodiment, the functions of call agent 100 may be distributed to more than one call agent 100, which decentralizes the functions of call agent 100. For example, a separate call agent 100 may be associated with each location 102. Between locations 102a and 102b, numerous pieces of network equipment may be present, including routers, switches, WAN-links, or any other suitable piece of network equipment.

Software, hardware, or a combination of the preceding may reside in QoS agents 104 to achieve the reservation function and the many features associated with the reservation function. QoS agents 104 may be in call agent 100, in the media path of the media stream, in a remote location, or in any suitable position to exact the reservation function. In another embodiment, QoS agents 104 may be included in endpoint 106 where endpoint 106 functions as a QoS agent 104. These elements may be equipped with, or include, any suitable component, device, application specific integrated circuit (ASIC), processor, microprocessor, algorithm, read-only memory (ROM), random access memory (RAM), erasable programmable ROM (EPROM), electrically erasable programmable ROM (EEPROM), field-programmable gate array (FPGA), or any other suitable element or object that is operable to facilitate the operations of the element. Additionally, any suitable logic comprising software, hardware, other logic, or any suitable combination of the preceding may perform the functions of communication system 10.

FIG. 2A is a flowchart 20 illustrating one embodiment of a method for securing a reservation in communication system 10. At block 200, the Reservation handling policy of location 102 of endpoint 106 is determined. Determining the Reservation handling policy of locations 102 allows call agent 100 to determine whether a reservation is needed for the call. At decision block 202, if it is determined that the Reservation handling policy is a no reservation policy, endpoints 106 begin exchanging media at block 204. If the Reservation handling policy is not a no reservation policy, call agent 100 determines whether the Reservation handling policy is a mandatory Reservation handling policy at decision block 206. Upon determining that the Reservation handling policy is not a mandatory Reservation handling policy, which means the Reservation handling policy is an optional Reservation handling policy, call agent 100 simultaneously instructs QoS agent 104 to attempt securing a reservation and rings a callee endpoint 106d at block 208. Decision block 210 determines whether a reservation has been secured for the optional Reservation handling policy. If a reservation is secured, the endpoints exchange media with a high QoS and the method proceeds at block 220. If a reservation is not secured, call agent 100 may proceed at "A" in FIG. 3A. The call connects at a lower QoS at block 212, and endpoints 106 exchange media.

At decision block 206, if the Reservation handling policy is determined to be a mandatory Reservation handling policy, call agent 100 instructs QoS agent 104 to attempt to secure a reservation at block 214. If a reservation is not secured at block 216, call agent 100 will exercise a reservation failure option at block 218. The reservation failure options for mandatory Reservation handling policy calls may include re-routing the call through a Public Switched Telephone Network (PSTN), releasing the call, or any other suitable reservation failure option. The reservation failure option may include connecting the call with degraded service. In order to prevent a call failure due to lack of a reservation, the call can be allocated as a different class of call and to a low priority queue in routers between the two endpoints 106 with a degraded level of service. If QoS agent 104 secures a reservation, the call between endpoints is connected and the exchange of media begins at block 220. Call agent 100 sends reserve commands to the appropriate QoS agents 104 upon a reservation being secured. After the reservation is secured, call agent 100 alerts callee endpoint 106d and connects the call between caller endpoint 106a and callee endpoint 106d.

From block 220, call agent 100 determines at block 222 whether the connected call has experienced a failing event. A failing event may include a call being preempted by another call that has a higher priority, a call that has insufficient bandwidth to continue, or any suitable failing event. Instead of the call being released because the failing event has occurred, the call continues with degraded service. For example, the degraded service may involve using a lower DSCP marking value, which lowers the QoS of the call. To continue the call with degraded service and support another call, the bandwidth originally supporting the call is reallocated based on the availability of the QoS.

In the illustrated embodiment, communication system 10 allows higher priority calls to preempt lower priority calls. Preempting the lower priority call may allow the higher priority call to use the reservation once secured by the lower priority call. In an embodiment, communication system 10 may not support MLPP and does not allow preemption. If the call has not been preempted, the exchange of media continues between endpoints 106 at the higher QoS. If the call has been preempted, endpoints 106 continue exchanging media at block 224 using a lower DSCP marking value, which means the media exchange has a lower priority and may not receive the best QoS. At block 226, an attempt is made to obtain a higher DSCP marking value during the call while the media exchange continues. Obtaining a higher DSCP marking value during the call improves the call's QoS. From block 226, the method may continue from "A" in FIG. 3. The call terminates at block 228 and the method subsequently ends.

FIG. 2B illustrates an example message flow among endpoints 106a and 106d, QoS agents 104a and 104b, and call agent 100 when a reservation for an audio stream is mandatory. The sample call flow refers to a scenario where both endpoints 106a and 106d are SCCP phones. Changes to the call flow where one or both of endpoints 106a and 106d are SIP endpoints will be pointed out in the following discussion.

When call agent 100 receives an inbound call request from endpoint 106a, call agent 100 first checks the Reservation handling policy for the call between endpoints 106a and 106d before extending the call to endpoint 106d. If the Reservation handling policy is audio/video mandatory or video optional for the call, call agent 100 allocates QoS agent 104a for endpoint 106a and QoS agent 104b for endpoint 106d. Call agent 100 sends a RTPPortReq message to both QoS agents 104a and 104b to open RTP receiving ports for two-way audio streams. Call agent 100 instructs QoS agents 104a and 104b to listen on the receiving ports.

For the reservation from endpoint 106a to 106b, call agent 100 sends a QoSPath message to QoS agent 104a to instruct QoS agent 104a to initiate a PATH message to QoS agent 104b. Upon receiving the PATH message, QoS agent 104b sends a RESV message towards QoS agent 104a. The RESV message is transmitted along the reverse path as that of the PATH message and the traffic flow. When QoS agent 104a receives the RESV message, it notifies call agent 100 about the reservation status by sending a QoSRESVNotify message. A similar message flow applies for the reservation from endpoint 106d to endpoint 106a. A similar message flow will also occur for any video or data streams associated with the call between endpoints 106a and 106d.

Upon successful reservations of both audio streams, call agent 100 rings endpoint 106d and provides a ring back to endpoint 106a. When endpoint 106d goes off hook, call agent 100 connects the audio media between endpoints 106a and 106d. Upon one of endpoints 106a and 106d going on hook and terminating the call, call agent 100 instructs QoS agents 104a and 104b to tear down the RSVP reservation by sending a QoSTearDown message along with a direction parameter. For the send direction, the appropriate QoS agent initiates a PATHTear message. For the receive direction, the appropriate QoS agent initiates a RESVTear message. RSVP reservation teardown is independent of media stop streaming as media may stop streaming while an RSVP reservation still needs to be preserved. This is needed in the event of a hold/resume situation where an endpoint is placed on hold and the reservation is preserved in order to resume the call. Similar tear down message transfers will occur for a video or data stream accompanying any audio stream.

Call agent 100 can support different types of devices at endpoints 106a and 106d other than the SCCP phones described above. For example, an endpoint 106 may use a SIP device. The initial off hook and dial message found with SCCP devices are replaced with an INVITE message. The ringing, ring back, and off hook messages found with the use of SCCP devices are replaced by an INVITE message provided by call agent 100 to QoS agent 104b, a RINGING message provided by QoS agent 104b to call agent 100, a 200 OK message from QoS agent 104b to call agent 100 an ACK message from call agent 100 to QoS agent 104b, a 200 OK message from call agent 100 to QoS agent 104a, and an ACK message from QoS agent 104a to call agent 100. At this point, media is streaming between endpoints 106a and 106d. The on hook message (assuming the example of endpoint 106d going on hook first) is replaced by a BYE message from QoS agent 104b to call agent 100, a 200 OK message from call agent 100 to QoS agent 104b, a BYE message from call agent 100 to QoS agent 104a, and a 200 OK message from QoS agent 104a to call agent 100.

For an endpoint 106 using a H323 device, the initial off hook and dial message is replaced by a H225Setup message. The ringing, ring back, and off hook messages found with the use of SCCP devices are replaced by a H225Setup message provided by call agent 100 to QoS agent 104b, a H225Alert message provided by QoS agent 104b to call agent 100, a H225Alert message provided by call agent 100 to QoS agent 104a, a H225Alert message from QoS agent 104b to call agent 100, and a H225Alert message from call agent 100 to QoS agent 104a. Call agent 100 can also support other types of endpoints 106 and also supports the implementation where endpoint 106a has a different type of device than endpoint 106d.

For the audio/video mandatory Reservation handling policy, a failure in acquiring a reservation for both the audio stream and the video/data stream in the direction from endpoint 106a to endpoint 106d results in call agent 100 rejecting the call setup request from the calling endpoint 106a. For the video optional Reservation handling policy, call agent 100 rejects call setup if a reservation is not obtained for an audio stream from endpoint 106a to endpoint 106d. The same rejection applies if reservations from endpoint 106d to endpoint 106a are not obtained for the call. It may be possible to have a Reservation handling policy for endpoint 106a that is different than the Reservation handling policy for endpoint 106d. Call agent 100 will reject any call setup requiring a reservation that is not obtained.

FIG. 2C shows a message flow when call agent 100 is connecting the media upon successful reservation of each audio stream. When obtaining the reservations for each stream, call agent 100 will not know the exact bandwidth to use for the call before connecting the media. At this time, call agent 100 provides estimated bandwidth information in the QoSPath message. For an audio call, call agent 100 may use any estimated bandwidth between endpoints 106a and 106d determined in any manner. For a video call, call agent 100 may use a desired minimum value default video bandwidth. Upon connecting the media, call agent 100 can instruct QoS agents 104a and 104b to adjust RSVP bandwidth reservation for the call via a QoSModifyTSpec message. After each one-way media stream is established, call agent 100 can instruct QoS agents 104a and 104b to adjust bandwidth specifications if it is different from the one used in the QoSPath and QoS-Resv messages.

FIG. 3A is a flowchart 30 illustrating an embodiment of a method for retrying a reservation in communication system 10. The blocks in flowchart 30 may be within flowchart 20 of FIG. 2A. At block 300, call agent 100 determines whether a reservation error has occurred during the media exchange. A reservation error may include a mid-call failure or an initial call setup failing to secure a reservation. For example, a reservation error may occur when a call is preempted, when routers become inoperable during a call, or when any other error occurs that may cause a reservation to fail. A reservation error may occur if endpoints 106 lose an established reservation mid-call, or if endpoint 106, having an optional policy, cannot secure a reservation during the initial call setup. Retrying a reservation may occur for an optional Reservation handling policy call if a reservation is not secured initially or during mid-call, may occur for a mandatory Reservation handling policy call that fails mid-call, or may occur for any suitable policy that fails at any time during the call. If call agent 100 does not recognize an error, endpoints 106 continue exchanging media and checking for a reservation error. Through this retry mechanism, a call originally initiated with no reservation and no QoS priority can obtain a reservation and improved QoS during the call when resources and bandwidth become available.

If a reservation error is detected, call agent 100 initiates an internal retry timer at block 302. Call agent 100 includes a retry timer that sets at what time interval to retry securing a reservation. Alternatively, call agent 100 may set a count value establishing a total number of times retry is attempted. At block 304, QoS agent 104 attempts to secure a reservation during the time interval set on the retry timer. At decision block 306, a determination is made whether a reservation was secured during the time interval. If a reservation is secured, the call continues and endpoints 106 exchange media at block 308. The call may terminate at block 310 and the method subsequently ends. If reservations are lost in the middle of a call due to link/node or other failures, the failure situation may correct itself within a small amount of time. The retry timer or count avoids the teardown of a call immediately upon receiving a failure indication and allows call agent 100 to maintain the connection for the call and retry obtaining the lost reservations for a short period of time before the call fails.

If a reservation is not secured at decision block 306, call number 100 determines whether the time interval has exceeded or a maximum count has been reached at block 312. If not, the time interval or count is updated and QoS agent 104 retries to secure the reservation. If so, the method may proceed to "B" in FIG. 4. If N retries has not occurred at block 314, the method continues to retry securing a reservation.

Figure 3B:
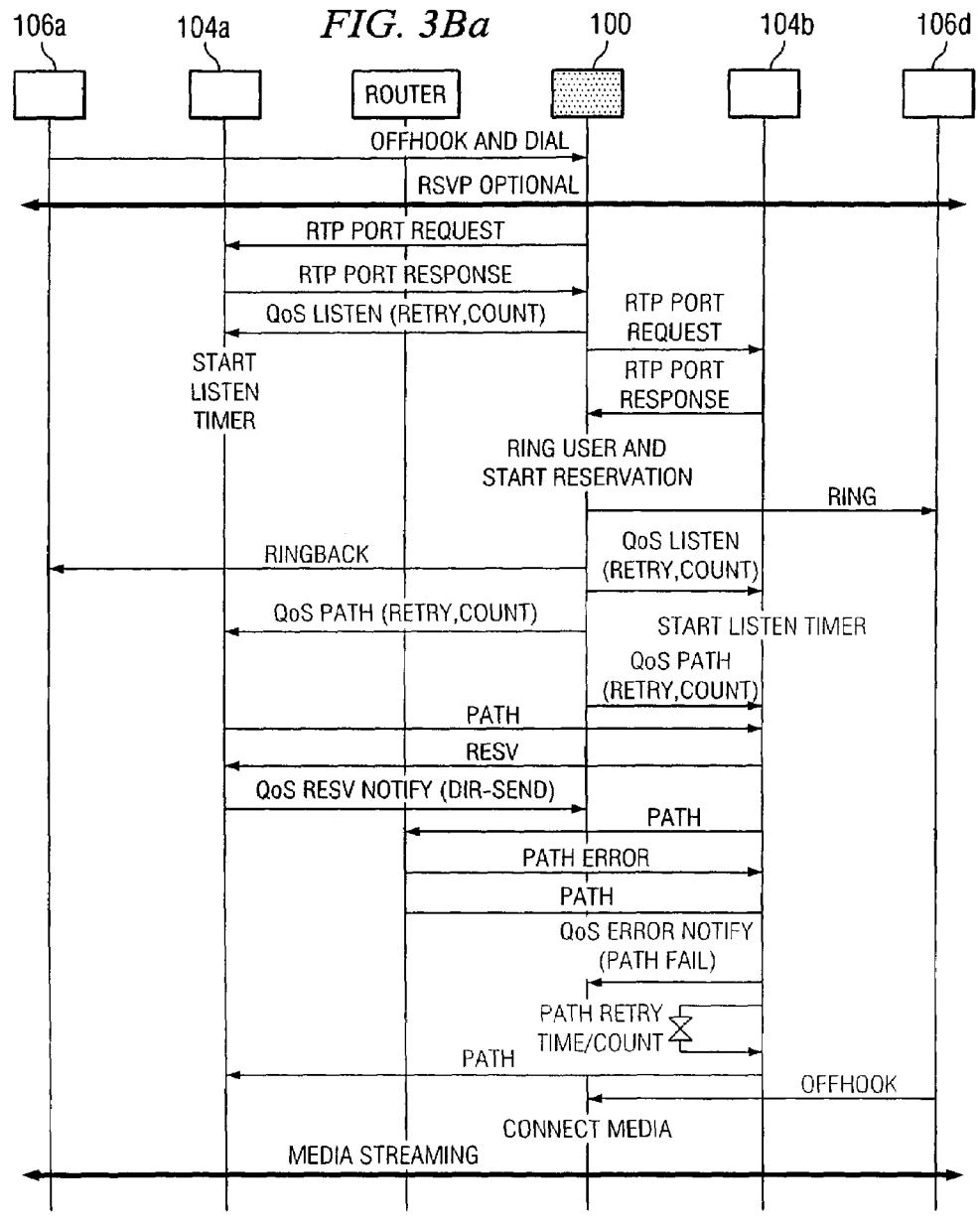
Figure 3B:
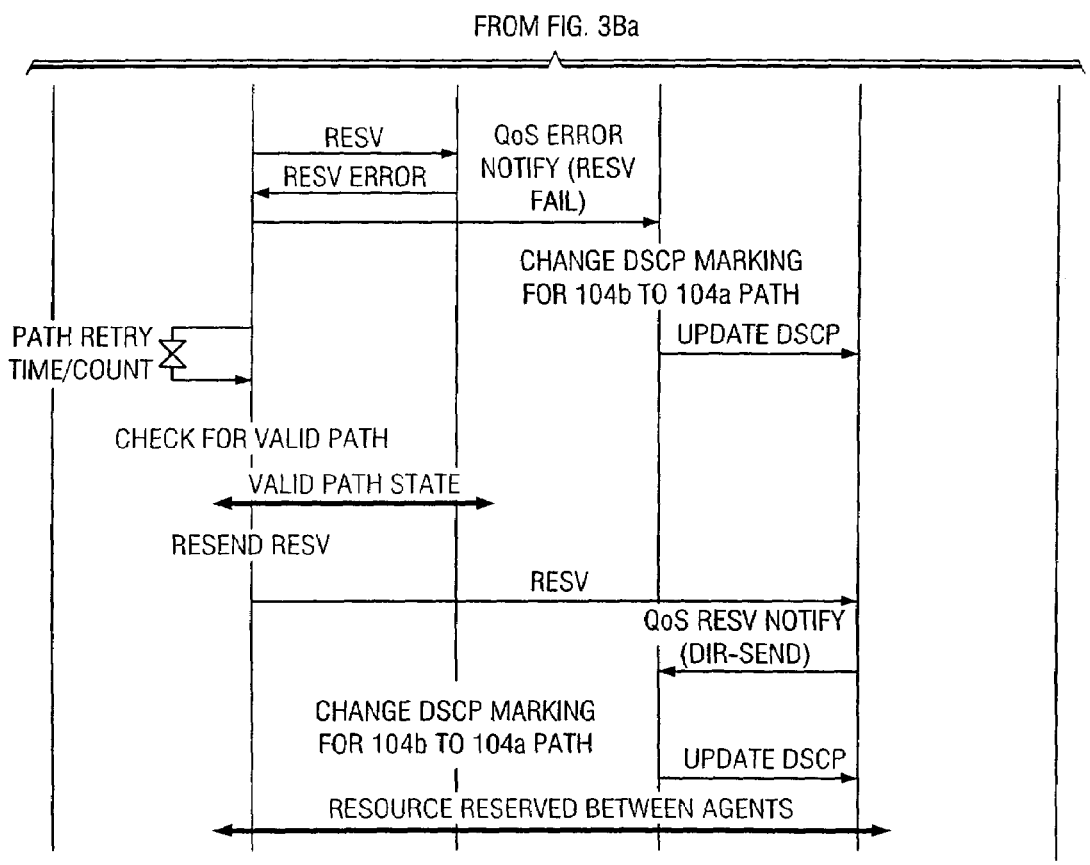

FIGS. 3Ba-3Bb show an example message flow between endpoints 106a and 106d, QoS agents 104a and 104b, and call agent 100 when a reservation for an audio stream is optional. This message flow also covers the retry scenarios of when a reservation is not required to connect endpoints 106 and when a reservation is lost or obtained after endpoints 106 begin exchanging media. When a reservation is not required to connect endpoints 106a to 106d, call agent 100 will send a RING message to endpoint 106d and begin simultaneously obtaining a reservation in parallel. Whether or not a reservation is obtained prior to endpoint 106d going off hook, a connection will be made between endpoint 106a and 106b. In an example, call agent 100 passes a retry=true state and retryTimer value to QoS agents 104a and 104b in the QoS-Path and QoSListen messages. When QoS agents 104a and 104b receive the QoSListen message, a ListenTimer is started. If either QoS agents 104a or 104b do not receive a PATH message before expiration of the ListenTimer, a QoS-ErrorNotify message is sent to call agent 100. At this time, if the Reservation handling policy was mandatory for the media stream, call agent 100 would reject the call setup request from the calling endpoint. In the optional scenario, call agent 100 merely logs the error. If QoS Agents 104a or 104b receive a PathError message, a path retry timer is started and a new PATH message is sent upon expiration of the timer. QoS agents 104a and 104b need only notify call agent 100 whenever there is a status change from an error condition to a non-error condition and vice versa in order to avoid repeatedly sending error messages to call agent 100.

Figure 4:
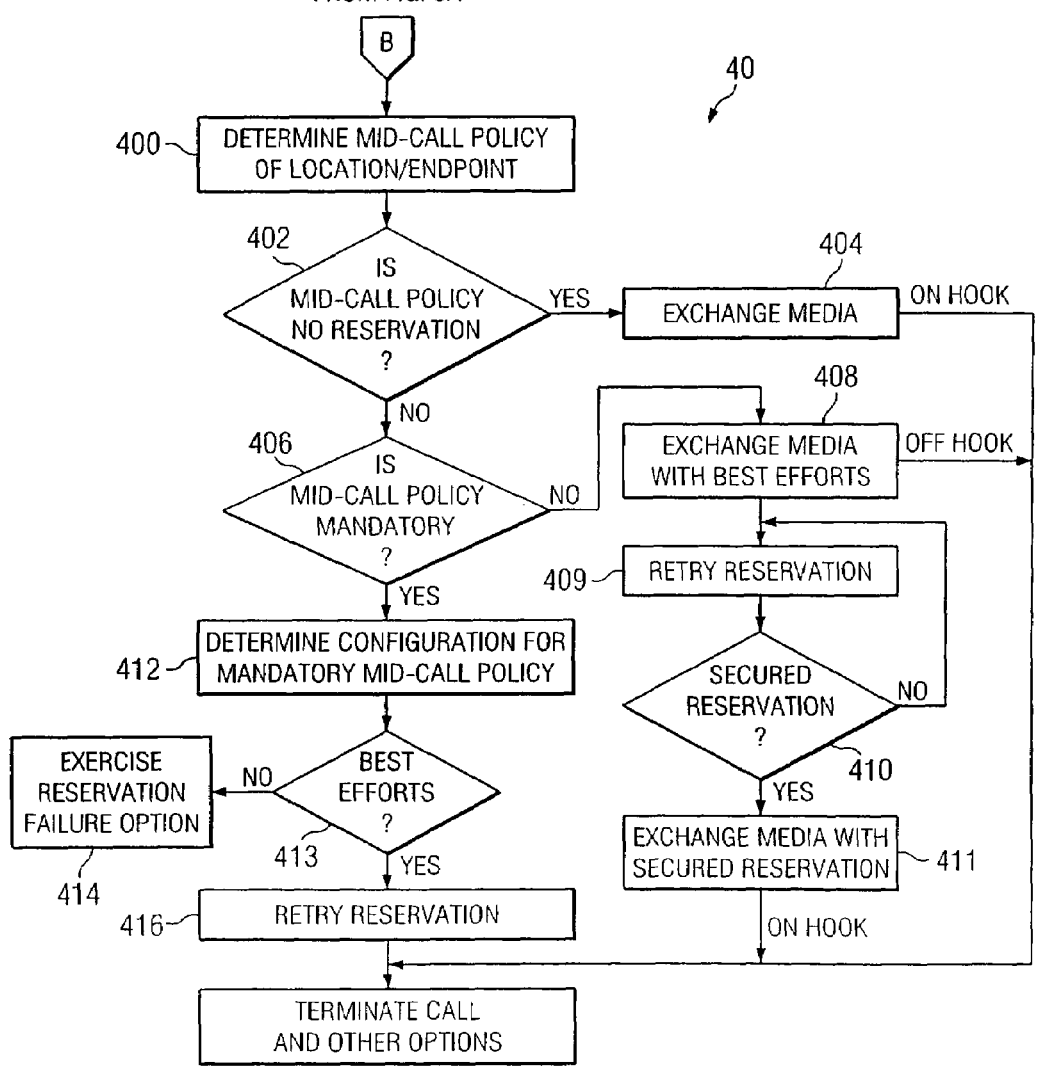
FIG. 4 is a flowchart illustrating an embodiment of a method for implementing a mid-call policy in the communication system.

FIG. 4 is a flowchart 40 illustrating one embodiment of a method for implementing a mid-call policy in communication system 10. The blocks included in flowchart 40 may be within flowchart 30 of FIG. 3A at any suitable place. The mid-call policy may be used to determine how a call proceeds when an attempt to secure a reservation is re-tried or may be used when a mid-call failure occurs. A mid-call failure may occur if a router becomes inoperable during the call or the reservation is lost for any reason. At block 400, the mid-call policy of location 102 of endpoint 106 is determined. Call agent 100 applies the mid-call policies, and the mid-call policies may be configured to be any suitable policy. For example, the mid-call policy may be a no reservation policy, a mandatory policy, or an optional policy. The mid-call policy may be the same as or independent of the original Reservation handling policy for the endpoints involved. Thus, a call may have a mandatory Reservation handling policy at initial setup but may have a weaker policy in response to any mid-call failures. This will prevent a call failure from occurring during the middle of media exchange between endpoints 106.

If it is determined at decision block 402 that the mid-call policy is a no reservation policy, endpoints 106 exchange media at block 404 and the call eventually terminates at block 418. However, if the mid-call policy is not a no reservation mid-call policy, it is determined whether the mid-call policy is a mandatory mid-call policy at block 406. If the mid-call policy is not a mandatory mid-call policy, which means the mid-call policy is an optional mid-call policy, the call proceeds with "best efforts" at block 408 and eventually terminates at block 418. Proceeding with "best efforts" allows the call to continue with the best available service, even though the service is not of the highest quality. A retry procedure may occur at block 409 to secure a reservation for this call. If a reservation is not secured at block 410, retry efforts will continue. If a reservation is secured at block 410, media is exchanged with the secured reservation at block 411.

With a mandatory mid-call policy, call agent 100 determines mid-call handling of the mandatory mid-call policy at block 412. If the mid-call handling is not "best efforts" at decision block 413, a reservation failure option will be exercised at block 414. The reservation failure options for a mid-call policy include re-routing the call through a PSTN, releasing the call, or any other suitable reservation failure option. A reservation failure option may also involve a one-time reservation retry in an attempt to obtain a reservation for the call prior to terminating the connection between the endpoints. If the mid-call handling is "best efforts," the call proceeds with the best available service and retries the RSVP reservation at block 416. The call terminates at block 418 and the method subsequently ends.

After resources between two endpoints 106 have been reserved and media is streaming between the two endpoints 106, a situation may arise where the reservation is lost. In an example situation shown in FIGS. 3Ba-3Bb, QoS agent 104a receives a RESVError message indicating that the reservation it established for endpoint 106a to receive media from endpoint 106d has been lost. QoS Agent 104a will send a QoS-ErrorNotify message to inform call agent 100 of the lost reservation. Call agent 100 will send an UpdateDSCP message to QoS agent 104b in order to change the DSCP marking to a lower class of service. QoS agent 104a will start a ResvRetryTimer and then check for a valid PATH state. If there is a valid PATH state, QoS agent 104a will send a RESV message in order to recover the reservation. If the PATH state is still not valid, QoS agent 104a will reset the ResvRetryTimer. Upon receipt of the RESV message, QoS agent 104b will inform call agent 100 by sending a QoSResvNotify message. Call agent 100 will then send an UpdateDSCP message to QoS agent 104b in order to reset the DSCP marking to a higher class of service.

The features discussed with respect to FIGS. 2A, 2B, 3A, 3Ba, 3Bb, and 4 may also apply to a call exchanging both audio and video streams. The features apply to each media stream separately. For example, if a video stream fails during a call, call agent 100 and QoS agent 104 may retry securing the reservation for the video stream while endpoints 106 continue exchanging the audio stream.

Figure 5B:
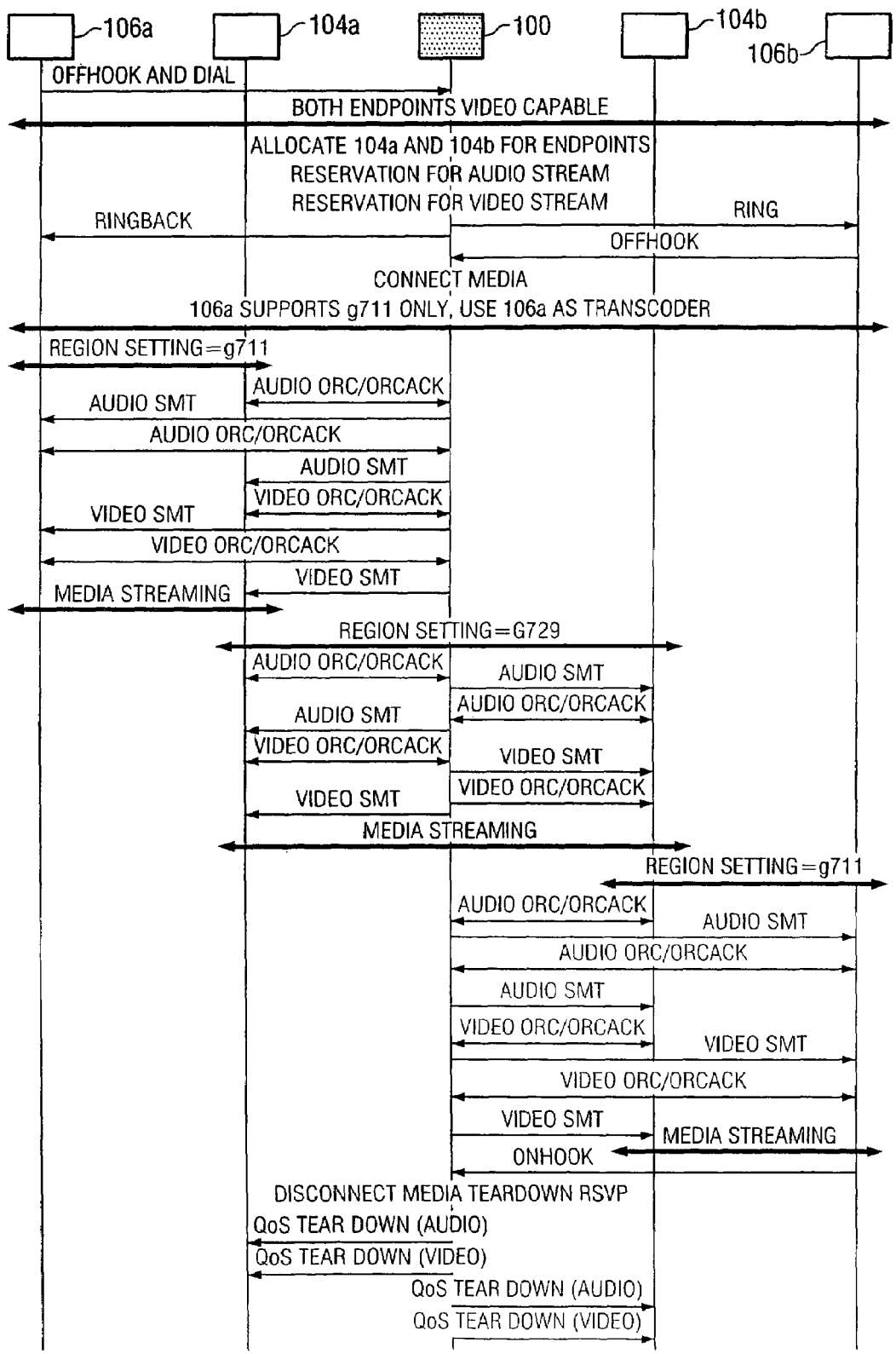

FIG. 5A is a flowchart 50 illustrating another embodiment, expanding on the concepts of FIGS. 2A and 2B, of a method for securing both a video and audio stream reservation in communication system 10. FIG. 5B shows an example message flow for an audio with video call. At block 500, the Reservation handling policy of the location is determined. If the Reservation handling policy is determined not to be a mandatory Reservation handling policy at decision block 502, which means the Reservation handling policy is an optional Reservation handling policy, an attempt is made to secure a reservation for each media stream, a reservation for the audio stream and a reservation for the video stream, at block 504. Call agent 100 also rings endpoint 106d at block 504 and the method continues to block 508. If the Reservation handling policy is a mandatory Reservation handling policy, an attempt is made to secure a reservation for each media stream, the audio stream and the video steam at block 506. In an embodiment, call agent 100 may determine whether the Reservation handling policy is a no reservation policy before determining whether the Reservation handling policy is mandatory or optional. At block 508, a decision is made whether a reservation for the audio stream has been secured. If the audio stream has not secured a reservation, a reservation failure option for the audio stream is exercised at block 510. Reservation failure options for the audio stream may include releasing the call, re-routing the call through a PSTN, or any other suitable reservation failure option for the audio stream.

Securing a reservation for the audio stream at block 508 allows the method to proceed to block 512 where call agent 100 connects the call and endpoints 106 begin exchanging audio. At decision block 514, it is determined whether the video stream has secured a reservation. If the video stream has not secured a reservation, a reservation failure option is exercised for the video stream at block 516. The reservation failure options for the video stream may include releasing the video stream or any other suitable reservation failure option for the video stream. If the video stream does secure a reservation, endpoints 106 exchange video and continue exchanging audio during the call at block 518. The call between endpoint 106 may terminate at block 520 and the method subsequently ends.

If a reservation is not obtained at block 508, for an audio optional Reservation handling policy, the call is connected at a lower QoS at block 522. The check for a video stream reservation is made at block 514. If a video stream reservation is not made, most likely since an audio stream reservation was not obtained, audio is continued to be exchanged between endpoints 106 at block 524. It is possible to provide video at this point with a lower QoS if so desired at block 524. The retry procedure discussed above may also be incorporated into this flowchart as desired whenever an audio or video reservation is not secured.

Bandwidth may be preserved in a RSVP environment. Preserving bandwidth is initiated when a feature is implemented during media exchange between endpoints 106. The feature may include placing an endpoint 106 on hold, invoking a supplementary service during the media exchange conferencing among three parties, or any suitable feature to trigger preserving bandwidth. A supplementary service causes the parties to change during a call.

Figure 6B:
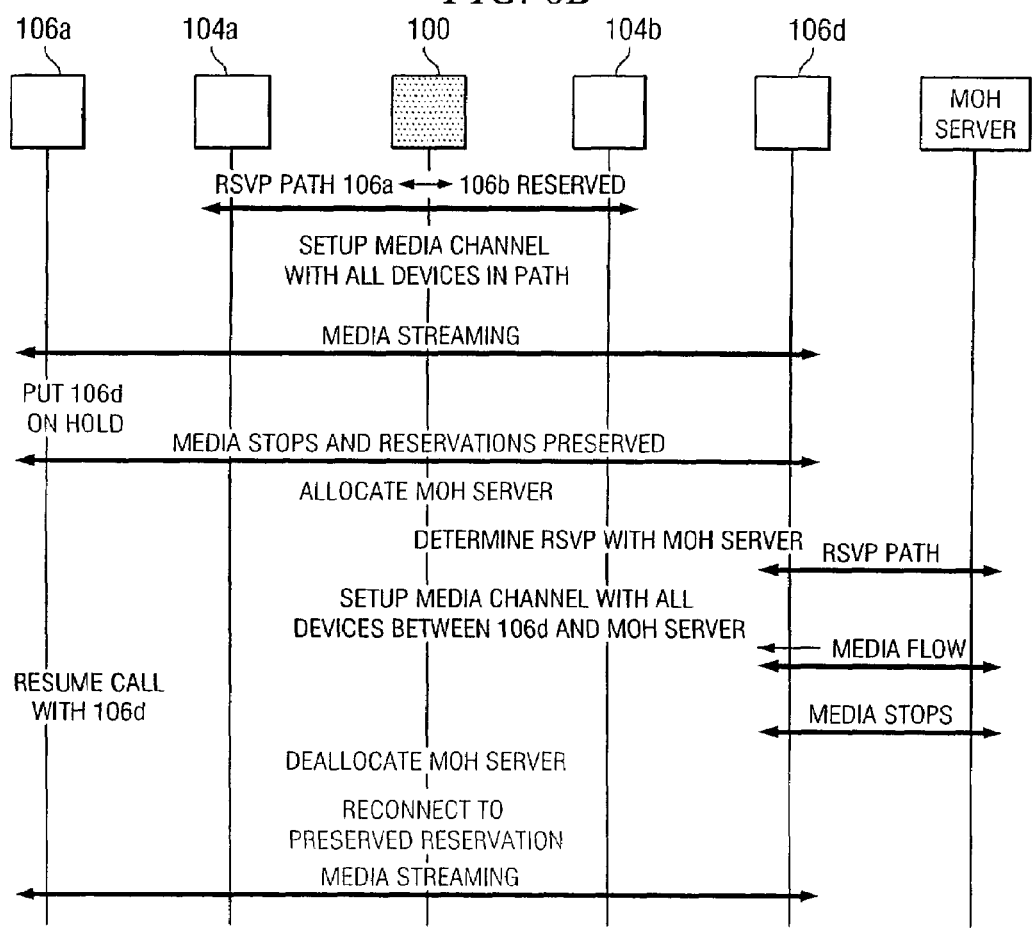

FIG. 6A is a flowchart illustrating an embodiment of a method for preserving bandwidth when an endpoint 106 is placed on hold. FIG. 6B is an example message flow for the on hold situation. Endpoints 106a and 106d exchange media using a RSVP reservation in block 600 that has been established as discussed above. At decision block 602, it is determined whether endpoint 106d is placed on hold by endpoint 106a. If endpoint 106d has not been placed on hold, the media exchange continues between endpoints 106a and 106d using the RSVP reservation. If endpoint 106d has been placed on hold by endpoint 106a, the reservation that endpoints 106a and 106d used is preserved at block 604. Preserving the reservation preserves the bandwidth that endpoints 106a and 106d used to exchange media.

A Music-on-Hold (MOH) server is used during on hold situations. At block 605, a determination is made as to whether a RSVP reservation is need between the MOH server and on hold endpoint 106d. If not, the MOH server sends media to on hold endpoint 106d at block 607 when endpoint 106a places endpoint 106d on hold. If a RSVP reservation is needed, a reservation is obtained at block 606 before media is exchanged at block 607. The MOH server may be in the path of QoS Agent 104a, 104b, or it may be remotely located. If MOH server is co-located with on hold endpoint 106d and QoS agent 104b, the preserved RSVP reservation is maintained and not used between the MOH server and on hold endpoint 106d. If the MOH server is co-located with endpoint 106a that placed endpoint 106d on hold, the preserved RSVP reservation may be reused to connect the MOH server with on hold endpoint 106d and reused again when endpoint 106a takes endpoint 106d off hold. If the MOH server is remotely located from both endpoint 106a and endpoint 106d, a new RSVP reservation may need to be established between on hold endpoint 106d and the MOH server. Decision block 608 determines whether on hold endpoint 106d is taken off hold by endpoint 106a. If on hold endpoint 106d remains on hold, the MOH server continues sending media to on hold endpoint 106d. If on hold endpoint 106d is taken off hold at decision block 608, the media exchange between on hold endpoint 106d and endpoint 106a resumes at block 610, using the preserved RSVP reservation. Therefore, the original RSVP reservation can be reused between holding endpoint 106a and holder endpoint 106d after the hold state ends. The original RSVP reservation may also be used when the MOH server is co-located with endpoint 106a and QoS Agent 104a when placing endpoint 106d on hold. The call eventually terminates at block 612 and the method subsequently ends. If reservations between on hold endpoint 106d and the MOH server cannot be obtained, tone on hold will be applied to on hold endpoint 106d.

Figure 7B:
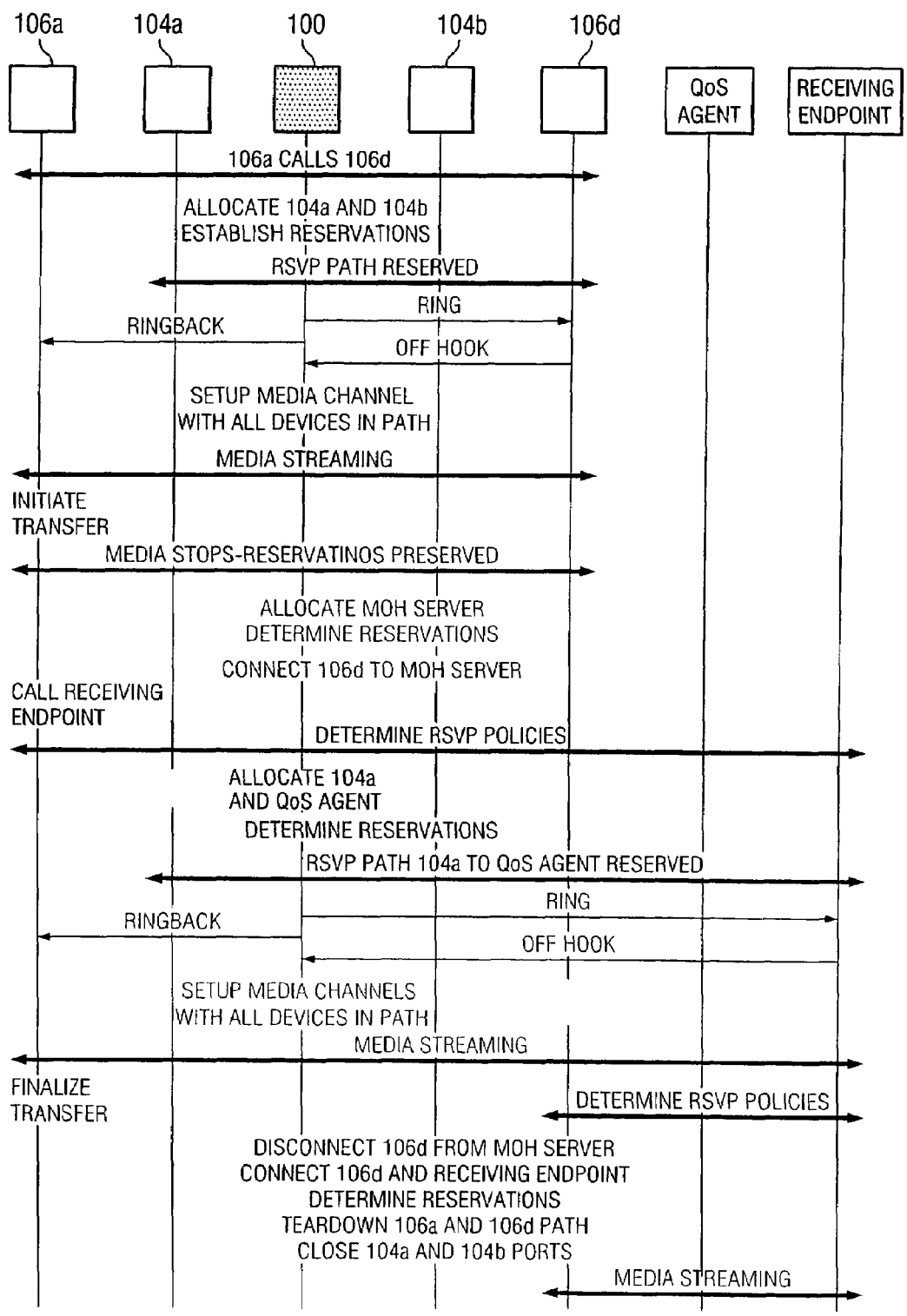

FIG. 7A is a flowchart 70 illustrating another embodiment of a method for preserving bandwidth when a call is transferred to a new endpoint 106. FIG. 7B is an example message flow for the call transfer situation. Endpoints 106a and 106d exchange media using a RSVP reservation in block 700 that has been established as discussed above. A supplementary service may be invoked during the media exchange. The supplementary service may include transferring a call between endpoints 106, forwarding a call to another endpoint 106, and any suitable supplementary service to enhance the media exchange. At decision block 702 in the illustrated embodiment, it is determined whether the call is to be transferred to another endpoint 106c. If the call is not to be transferred, the media exchange continues between endpoints 106a and 106d using the RSVP reservation. If endpoint 106a is transferring the call, the reservation used between endpoints 106a and 106d is preserved at block 704. Preserving the reservation preserves the bandwidth that endpoints 106a and 106d used to exchange media. Upon endpoint 106a initiating a transfer, endpoint 106d may be placed on hold as outlined above.

At decision block 706, it is determined whether transferred endpoint 106d is in the same location as endpoint 106c receiving the transferred call. If transferred endpoint 106d and receiving endpoint 106c are in the same location, transferred endpoint 106d and receiving endpoint 106c exchange media at block 708 either using a new reservation determined at block 707 or without using a reservation at all and the preserved RSVP reservation is released. The call eventually terminates at block 712. If the receiving endpoint is in a different location from both endpoints 106a and 106b at block 709, process also flows to block 707. If receiving endpoint 106c is in the same location as endpoint 106a, the preserved RSVP reservation from the original media exchange between transferred endpoint 106d and endpoint 106a may be reused. At block 710, the non-co-located endpoints 106 exchange media. The call eventually terminates at block 712 and the method subsequently ends.

The method may apply when any suitable supplementary service is invoked. For example, a conference call may re-use a preserved reservation if the conference bridge is in the same location as the endpoint beginning the conference call. Additionally, steps may be performed in any suitable order without departing from the scope of the invention.

Figure 8:
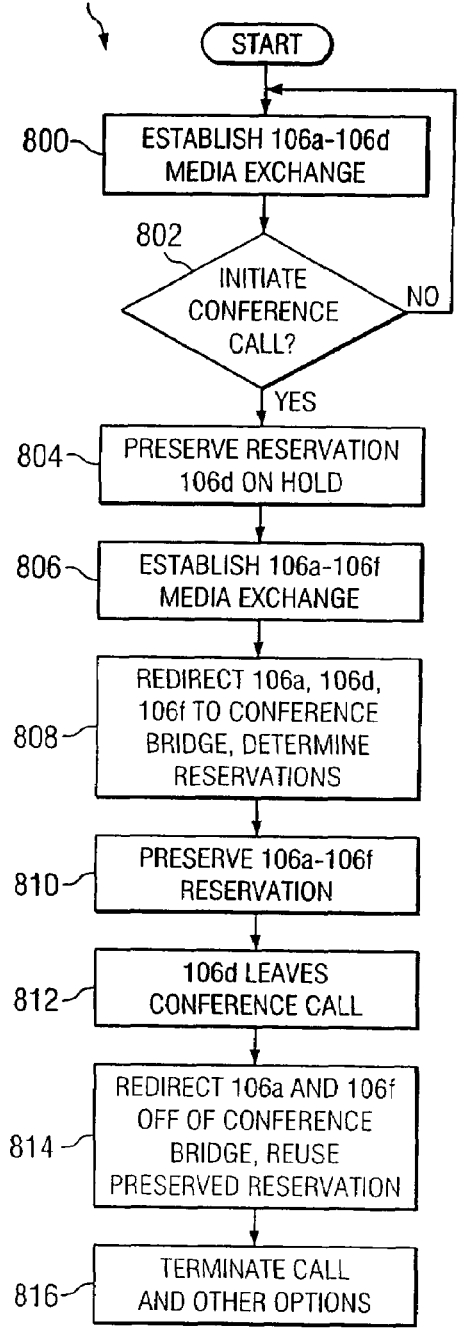
FIG. 8 is a flowchart illustrating another embodiment of a method for preserving bandwidth in a conference call situation.

FIG. 8 is a flowchart 80 illustrating another embodiment of a method for preserving bandwidth upon establishing of a conference call. Endpoint 106a establishes the exchange of media with endpoint 106d at block 800. Assuming reservations were obtained for the media exchange between endpoints 106a and 106d, these reservations will be preserved when endpoint 106a attempts to initiate a conference call among endpoint 106d and another endpoint 106f. Upon initiation of a conference call at block 802, the media exchange between endpoints 106a and 106d is disconnected and the reservation is preserved at block 804. This event essentially places endpoint 106d in an on hold state, the establishment of such a state being previously discussed above. Endpoint 106a will then establish a connection with endpoint 106f at block 806, using reservations as needed and as discussed above. Since endpoint 106f is in the same location as endpoint 106d, it may be possible to reuse the preserved reservations for the connection between endpoints 106a and 106d.

Upon establishing a connection with endpoint 106f, endpoint 106a initiates the conferencing capability so that each of endpoints 106a, 106d, and 106f can exchange media with each other. Endpoint 106d will be removed from its on hold status. Upon initiating the conference call, each of endpoints 106a, 106d, and 106f are redirected to a conference bridge at block 808 so that media exchange can occur. The reservations between endpoints 106a and 106f will be preserved at block 810. Call agent 100, through QoS agents 104a and 104b, will perform RSVP reservations individually for each of endpoints 106a, 106d, and 106f with the conference bridge. Preserved Reservations may be reused if the conference bridge is co-located with either QoS agents 104a or 104b. If endpoint 106d leaves the conference call at block 812, call agent 100 may redirect endpoints 106a and 106f off of the conference bridge at block 814 and reestablish the preserved reservations between endpoints 106a and 106f for a direct exchange of media. Call agent 100 will release the reservations between endpoints 106a and 106d and endpoints 106a and 106f at block 816 upon termination in each reservation by one of the endpoints 106.

FIG. 9 is a flowchart 90 illustrating another embodiment of a method for preserving bandwidth for a call forwarding implementation. Call agent 100 may support at least three types of call forwarding—call forward all, call forward no answer, and call forward busy. An example forwarding situation when endpoint 106a calls endpoint 106d at block 900 and endpoint 106d has its calls possibly forwarded to endpoint 106f at block 902. If call forwarding is not enabled, then media is exchanged between endpoints 106a and 106d at block 904. For a call forward all operation, a call from endpoint 106a to endpoint 106d will immediately be extended to endpoint 106f. Call agent 100 needs to only establish RSVP reservations between QoS agents 104a and 104b at block 908 for an exchange of media between endpoints 106a and 106f at block 910. For a call forward no answer operation, call agent 100 establishes reservations between endpoints 106a and 106d at block 912. A timer is initiated and the call will be extended to endpoint 106f upon expiration of the timer if endpoint 106d does not answer at block 914. Before forwarding the call to endpoint 106f, call agent will release the reservations associated with endpoint 106d and establish reservations associated with endpoints 106a and 106f. Call agent 100 may reuse the reservations associated with endpoint 106d for endpoint 106f if they are co-located. For a call forward busy operation, no timer is used and forwarding will begin immediately upon determining that endpoint 106d is off hook at block 916. If endpoint 106d should answer, then media is exchanged between endpoints 106a and 106d at block 916. The call eventually terminates at block 918.

FIG. 10A is a message flow illustrating a shared line implementation. In this scenario, endpoints 106d and 106f share the same directory number. When endpoint 106a desires to establish a connection through this directory number, RSVP reservations are established between endpoint 106a and both endpoints 106d and 106f. If endpoints 106d and 106f are in the same location, a single QoS agent 104b is used in establishing the RSVP reservations that are shared for endpoints 106d and 106f. If endpoints 106d and 106f are in different locations, separate reservations are established through QoS agent 104b for endpoint 106d and a different QoS agent for endpoint 106f. Upon establishing, or concurrently with establishing, the reservations between endpoint 106a and endpoints 106d and 106f, ring signals are provided to both endpoints 106d and 106f. In the example shown, endpoint 106d goes off hook first and media is exchanged between endpoint 106a and 106d. Any reservations established with endpoint 106f will then be torn down.

Figure 10B:
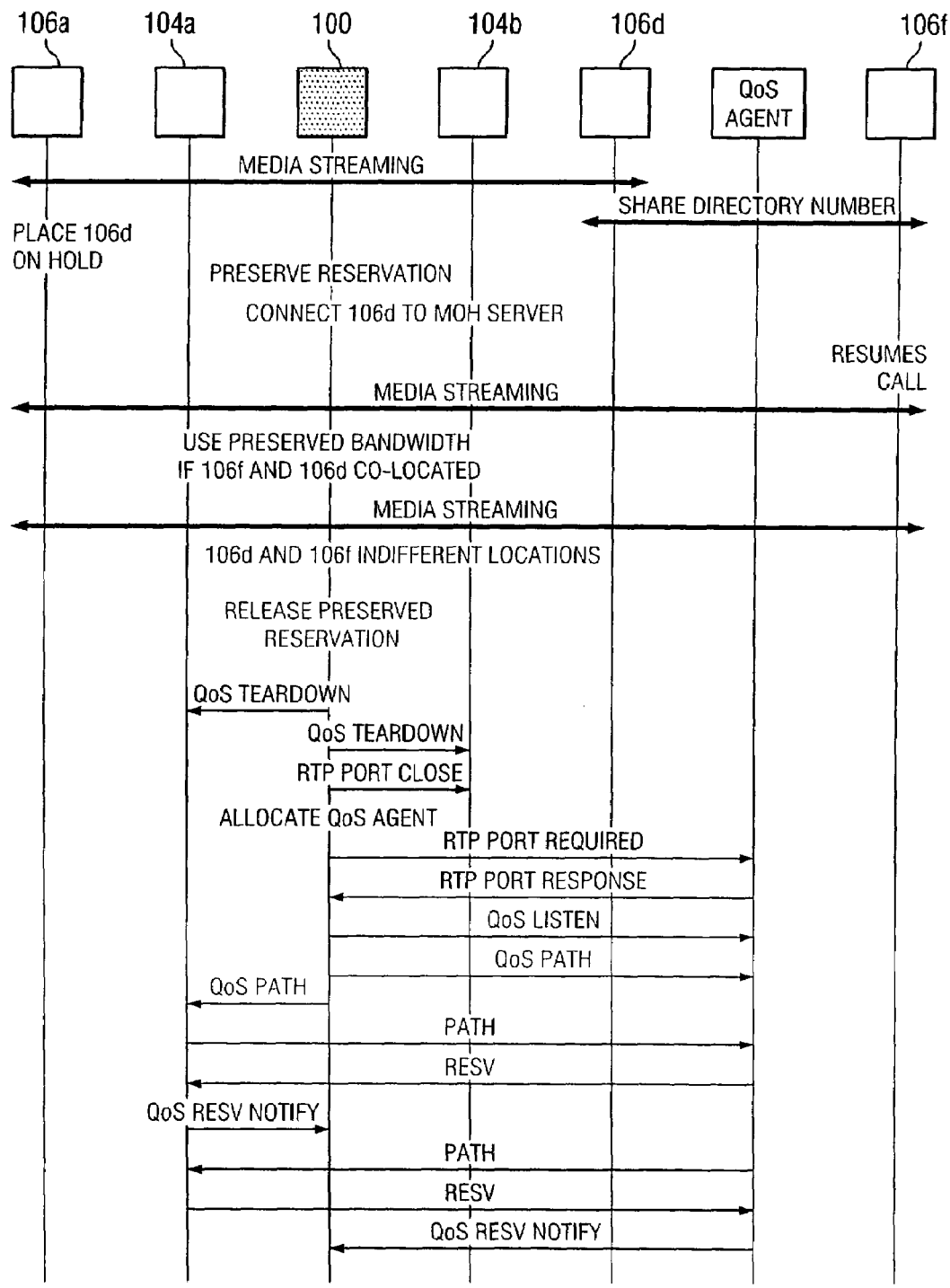

FIG. 10B is a message flow illustrating an on hold event in a shared line implementation. In this scenario, endpoint 106a places endpoint 106b on hold as previously discussed and the reservations are preserved. However, being a shared line, endpoint 106f resumes the call with endpoint 106a. If endpoint 106f is co-located with endpoint 106d, then the preserved reservations can be reused for the endpoint 106a to endpoint 106f connection. If endpoint 106f is in a different location than endpoint 106d, then the preserved reservations are released and new reservations for the endpoint 106a to endpoint 106f connections are established in a manner as previously described above. Call agent 100 allocates a new QoS agent for endpoint 106f and the connection with endpoint 106d is torn down.

Figure 11:
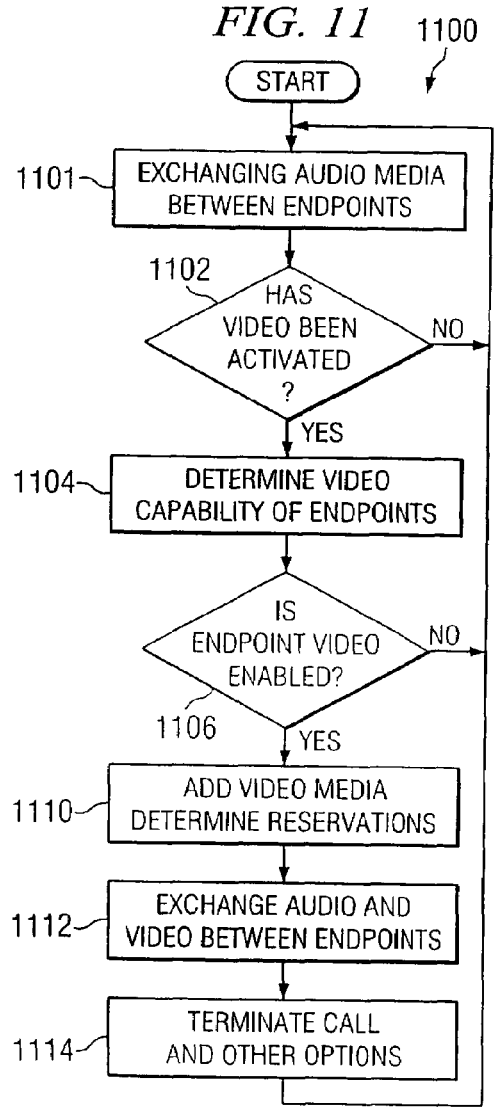
FIG. 11 is a flowchart illustrating an embodiment for activating video media during a connected call.

FIG. 11 is a flowchart 1100 illustrating an embodiment for activating video media during a connected call. Endpoints 106 exchange audio media between each other in block 1101. Call agent 100 dynamically determines whether video has been activated at decision block 1102. If video is not activated, caller endpoint 106a and callee endpoint 106d continue to exchange audio media. If video is activated, call agent 100 determines the video capability of callee endpoint 106d at block 1104. Decision block 1106 determines whether callee endpoint 106d is video enabled. If callee endpoint 106d does not have video capability, call agent 100 does not add video media to the media stream and the exchange of audio media between caller endpoint 106a and callee endpoint 106d continues. If callee endpoint 106d is video enabled, video media is added to the call with a RSVP reservation at block 1110. Endpoints 106 now may exchange audio and video media at block 1112. While exchanging audio media, video media, or both, the call terminates at block 1114 and the method subsequently ends.

In another embodiment, endpoints 106 may be exchanging video media in addition to the audio media. In this embodiment, the video media is deactivated from the call if receiving endpoint 106c is not video enabled. For example, callee endpoint 106d may transfer the call from caller endpoint 106a to receiving endpoint 106c. While caller endpoint 106a and callee endpoint 106d exchanged video media, receiving endpoint 106c may not have video capability. Call agent 100 dynamically detects the video capability of receiving endpoint 106c, instructs QoS agent 104 to release the reservation resources for the video media, and initiates the RSVP reservation's release.

As discussed above, the RSVP mechanism is synchronized with call signaling in order to, when appropriate, delay or hold the ring alert to the called party until the reservation is successful under mandatory conditions. Call agent 100 also has the ability to fail or re-route the call on a reservation failure as appropriate, including providing proper notification to the end user. For example, call agent 100 provides at least the same notification as other Call Admission Control types about the reservation failure to an end user in a mandatory situation. For an IP phone, call agent 100 may display "not enough bandwidth" and provide a fast busy tone to the end user. The fast busy tone may be replaced by a voice prompt indicating the failure condition. In an optional situation, the call can still proceed even with a RSVP failure during call setup. The call is then likely to begin with poor voice quality. However, this poor quality state may be transient and the automatic reservation retry capability may succeed during the call to provide adequate bandwidth. Call agent 100 may initially inform the end user that impaired audio may be experienced for the call. Once a reservation is obtained, call agent 100 may inform the end user that normal network conditions have been achieved and good audio quality has been restored.

QoS agents 104 act as a proxy for call agent 100 in implementing the RSVP mechanism. QoS agents 104 work independently of the endpoints 106 and provide appropriate RSVP control messaging to call agent 100. In this manner, endpoints 106 may be of various types of devices implementing different protocols as shown above. QoS agents 104 coordinates with call agent 100 to synchronize the RSVP signaling with the call signaling. The functionality of QoS agents may be contained in a single entity or distributed throughout the network. The QoS agent functionality may be placed into call agent 100 or locations 102 in whole or in part. Through the use of QoS agents 104, the RSVP mechanism may be separated and apart from the media path between endpoints 106.

Modifications, additions, or omissions may be made to any flowchart or message flow described above without departing from the scope of the invention. Additionally, steps may be performed in any suitable order without departing from the scope of the invention.

Certain embodiments of the invention may provide one or more technical advantages. A technical advantage of one embodiment may be that RSVP can be used in a system without having to touch every endpoint. The endpoints may support different protocols and interact with RSVP within the same system. Furthermore, endpoints that are RSVP-enabled can communicate with non-RSVP enabled endpoints. Another technical advantage of another embodiment may be that calls do not fail if a RSVP reservation is not secured with the initial attempt. Allowing calls to proceed without a RSVP reservation prevents complete call failure. Yet another technical advantage of an embodiment may be that calls may gain a reservation during a call, which improves the QoS, or may restore a reservation that fails mid-call, which also improves a call's QoS.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A method for preserving bandwidth in a Resource Reservation Setup Protocol (RSVP) environment, comprising:
   facilitating communication between a first endpoint and a second endpoint of a plurality of endpoints, wherein the first endpoint and the second endpoint communicate using a first reservation;
   determining whether a conference feature has been implemented by the first endpoint during the communication between the first endpoint and the second endpoint;
   preserving the first reservation between the first endpoint and the second endpoint in accordance with the determination that the conference feature has been implemented;
   facilitating communication between the first endpoint and a third endpoint of the plurality of endpoints wherein the first endpoint and the third endpoint communicate using a second reservation;
   preserving the second reservation between the first endpoint and the third endpoint in accordance with the determination that the conference feature has been implemented;
   facilitating communication between the first endpoint, the second endpoint, and the third endpoint with a conference bridge using third, fourth, and fifth reservations respectively in accordance with the conference feature.

2. The method of claim 1, further comprising resuming the communication between the first endpoint and the second endpoint using the preserved first reservation in accordance with the determination of whether the conference feature is terminated.

3. The method of claim 1, further comprising exchanging media between the second endpoint and the conference bridge upon implementation of the conference feature.

4. The method of claim 1, wherein the conference feature includes placing the second endpoint of the plurality of endpoints on hold.

5. The method of claim 1, wherein the conference feature includes invoking a supplementary service during the communication between the first endpoint and the second endpoint.

6. The method of claim 3, further comprising:
   determining a location associated with the first endpoint and the conference bridge;
   securing the fourth reservation to implement the conference feature in accordance with the determination of the location associated with the first endpoint and the conference bridge.

7. The method of claim 6, further comprising using the preserved first reservation as the fourth reservation to implement the conference feature, wherein the first endpoint and the conference bridge are associated with a same location.

8. The method of claim 6, further comprising obtaining a new reservation as the fourth reservation to implement the conference feature, wherein the first endpoint and the conference bridge are associated with different locations.

9. The method of claim 3, further comprising:
   determining a location associated with the second endpoint and the conference bridge;
   implementing the conference feature without securing a reservation between the second endpoint and the conference bridge, wherein the second endpoint and the conference bridge are associated with the same location.

10. A computer readable storage medium encoded with logic for preserving bandwidth in a Resource Reservation Setup Protocol (RSVP) environment, the logic operable to:
    facilitate communication between a first endpoint and a second endpoint of a plurality of endpoints, wherein the first endpoint and the second endpoint communicate using a first reservation;

determine whether a conference feature has been implemented by the first endpoint during the communication between the first endpoint and the second endpoint;

preserve the first reservation between the first endpoint and the second endpoint in accordance with the determination that the conference feature has been implemented;

facilitate communication between the first endpoint and a third endpoint of the plurality of endpoints wherein the first endpoint and the third endpoint communicate using a second reservation;

preserve the second reservation between the first endpoint and the third endpoint in accordance with the determination that the conference feature has been implemented;

facilitate communication between the first endpoint, the second endpoint, and the third endpoint with a conference bridge using third, fourth, and fifth reservations respectively in accordance with the conference feature.

11. The computer readable storage medium of claim 10, the logic operable to resume the communication between the first endpoint and the second endpoint using the preserved first reservation in accordance with the determination of whether the conference feature is terminated.

12. The computer readable storage medium of claim 10, the logic operable to exchange media between the second endpoint and the conference bridge.

13. The computer readable storage medium of claim 10, wherein the conference feature includes placing the second endpoint of the plurality of endpoints on hold.

14. The computer readable storage medium of claim 10, wherein the conference feature includes invoking a supplementary service during the communication between the first endpoint and the second endpoint.

15. The computer readable storage medium of claim 12, the logic operable to:
  determine a location associated with the first endpoint and the conference bridge;
  secure the fourth reservation to implement the conference feature in accordance with the determination of the location associated with the first endpoint and the conference bridge.

16. The computer readable storage medium of claim 15, the logic operable to use the preserved first reservation as the fourth reservation to implement the conference feature, wherein the first endpoint and the conference bridge are associated with a same location.

17. The computer readable storage medium of claim 15, the logic operable to obtain a new reservation as the fourth reservation to implement the conference feature, wherein the first endpoint and the conference bridge are associated with different locations.

18. The computer readable storage medium of claim 12, the logic operable to:
  determine a location associated with the second endpoint and the conference bridge;
  implement the conference feature without securing a reservation, wherein the second endpoint and the conference bridge are associated with the same location.

19. A system for preserving bandwidth in a Resource Reservation Setup Protocol (RSVP) environment, comprising:
  means for facilitating communication between a first endpoint and a second endpoint of a plurality of endpoints, wherein the first endpoint and the second endpoint communicate using a first reservation;
  means for determining whether a conference feature has been implemented during the communication between the first endpoint and the second endpoint;
  means for preserving the first reservation between the first endpoint and the second endpoint in accordance with the determination that the conference feature has been implemented;
  means for facilitating communication between the first endpoint and a third endpoint of the plurality of endpoints wherein the first endpoint and the third endpoint communicate using a second reservation;
  means for preserving the second reservation between the first endpoint and the third endpoint in accordance with the determination that the conference feature has been implemented;
  means for facilitating communication between the first endpoint, the second endpoint, and the third endpoint with a conference bridge using third, fourth, and fifth reservations respectively in accordance with the conference feature.

20. The system of claim 19, further comprising means for resuming the communication between the first endpoint and the second endpoint using the preserved first reservation in accordance with the determination of whether the conference feature is terminated.

21. The system of claim 19, further comprising means for exchanging media between the second endpoint and the conference bridge.

22. The system of claim 19, wherein the conference feature includes placing the second endpoint of the plurality of endpoints on hold.

23. The system of claim 19, wherein the conference feature includes invoking a supplementary service during the communication between the first endpoint and the second endpoint.

24. The system of claim 21, further comprising:
  means for determining a location associated with the first endpoint and the conference bridge;
  means for securing a fourth reservation to implement the conference feature in accordance with the determination of the location associated with the first endpoint and the feature implementation endpoint conference bridge.

25. The system of claim 24, further comprising means for using the preserved first reservation as the fourth reservation to implement the conference feature, wherein the first endpoint and the conference bridge are associated with a same location.

26. The system of claim 24, further comprising means for obtaining a new reservation as the fourth reservation to implement the conference feature, wherein the first endpoint and the conference bridge are associated with different locations.

27. The system of claim 21, further comprising:
  means for determining a location associated with the second endpoint and the conference bridge;
  means for implementing the conference feature without securing a reservation, wherein the second endpoint and the conference bridge are associated with the same location.

28. A system for preserving bandwidth in a Resource Reservation Setup Protocol (RSVP) environment, comprising:
  a first quality of service agent and a second quality of service agent operable to facilitate communication between a first endpoint and a second endpoint of a plurality of endpoints, wherein the first endpoint and the second endpoint communicate using a first reservation;
  a call agent coupled to the first QoS agent and the second QoS agent, the call agent is operable to determine whether a conference feature has been implemented by the first endpoint during the communication between the first endpoint and the second endpoint, the call agent is operable to preserve the first reservation between the first endpoint and the second endpoint in accordance with the determination that the conference feature has been implemented;

the first quality of service agent and a third quality of service agent operable to facilitate communication between the first endpoint and a third endpoint of a plurality of endpoints, wherein the first endpoint and the third endpoint communicate using a second reservation;

the call agent operable to preserve the second reservation between the first endpoint and the third endpoint in accordance with the determination that the conference feature has been implemented;

the first, second, and third quality of service agents operable to facilitate communication between the first endpoint, the second endpoint, and the third endpoint with a conference bridge using third, fourth, and fifth reservations respectively in accordance with the conference feature.

* * * * *